March 20, 1956 C. A. LOVELL 2,739,298

MULTIFREQUENCY HIGH SPEED CALLING SIGNAL GENERATOR

Filed Jan. 7, 1953 13 Sheets-Sheet 1

INVENTOR
C. A. LOVELL
BY William F. Simpson.

ATTORNEY

March 20, 1956 C. A. LOVELL 2,739,298

MULTIFREQUENCY HIGH SPEED CALLING SIGNAL GENERATOR

Filed Jan. 7, 1953 13 Sheets-Sheet 2

INVENTOR
C. A. LOVELL
BY William F. Simpson,
ATTORNEY

INVENTOR
C. A. LOVELL
BY William F. Simpson.
ATTORNEY

March 20, 1956 C. A. LOVELL 2,739,298

MULTIFREQUENCY HIGH SPEED CALLING SIGNAL GENERATOR

Filed Jan. 7, 1953 13 Sheets-Sheet 4

INVENTOR
C. A. LOVELL
BY William F. Simpson
ATTORNEY

INVENTOR
C. A. LOVELL
BY William F. Simpson.
ATTORNEY

March 20, 1956 C. A. LOVELL 2,739,298

MULTIFREQUENCY HIGH SPEED CALLING SIGNAL GENERATOR

Filed Jan. 7, 1953 13 Sheets-Sheet 6

INVENTOR
C. A. LOVELL
BY William F. Simpson.
ATTORNEY

MULTIFREQUENCY HIGH SPEED CALLING SIGNAL GENERATOR

Filed Jan. 7, 1953 13 Sheets-Sheet 7

AMPLIFIER, CLIPPER AND PULSE GENERATOR

INVENTOR
C. A. LOVELL
BY William F. Simpson.
ATTORNEY

INVENTOR
C. A. LOVELL
BY William F. Linspson.
ATTORNEY

INVENTOR
C. A. LOVELL
BY William F. Simpson.
ATTORNEY

MULTIFREQUENCY HIGH SPEED CALLING SIGNAL GENERATOR

INVENTOR
C. A. LOVELL
BY William F. Simpson.
ATTORNEY

INVENTOR
C. A. LOVELL
BY William F. Simpson
ATTORNEY

INVENTOR
C. A. LOVELL
BY William F. Simpson
ATTORNEY

INVENTOR
C. A. LOVELL
BY William F. Simpson
ATTORNEY

United States Patent Office 2,739,298

Patented Mar. 20, 1956

2,739,298

MULTIFREQUENCY HIGH SPEED CALLING SIGNAL GENERATOR

Clarence A. Lovell, Summit, N. J., assignor to Bell Telephone Laboratories, Incorporated, New York, N. Y., a corporation of New York Application January 7, 1953, Serial No. 330,114

6 Claims. (Cl. 340—171)

This invention is a continuation-in-part of my co-pending application Serial No. 1,471, filed January 9, 1948, which issued on November 3, 1953, as United States Patent No. 2,658,189, and relates to new and improved electrical signaling systems.

More particularly this invention relates to new and improved circuits, methods and apparatus of a new high speed electrical signaling system capable of operating over voice frequency telephone communication channels including direct-current telephone communication channels, i. e., low frequency carrier current telephone communicating channels, radio communication channels including ultra-high frequency radio communication channels. This invention operates over radio communication channels which employ amplitude modulation, phase modulation, frequency modulation carrier current, as well as communication channels employing pulse modulation such as pulse length modulation, pulse time modulation, pulse code modulation, etc.

This invention relates to a new high speed system of electrical code signaling which may be applied, for example, in communication code signaling such as telegraph code signaling. The system of this invention also may be applied to advantage in transmitting signals from a telephone or telegraph subscriber's station to control the operation of automatic electromechanical or electronic switching equipment at a telephone or telegraph switching station to establish interconnections between calling and called stations, including the passing of information between control circuits in the same and in different central offices or switching stations and in signaling over toll circuits. In such applications the higher signaling speed obtainable effects a large economy in the amount of switching equipment required to handle a given volume of calls.

The maximum speed for non-interfering signals having no direct-current component has been determined theoretically by H. Nyquist and published in an article entitled "Certain topics in telegraph transmission" in the "Transactions of the American Institute of Electrical Engineers," volume 47, pages 617 to 644, April 1928. The speed of signaling in exemplary systems embodying the present invention approaches or is equal to the theoretical maximum postulated by Nyquist in the above-identified article.

In any large automatic communication system as presently arranged and as is generally well understood, in addition to subscribers' lines, link circuits, trunk circuits, etc. over which communication takes place after a connection is established, there is a considerable amount of complementary equipment such as sender circuits, decoder circuits and marker circuits, etc., each of which is connected temporarily to the communication path or indirectly employed to establish the desired connection between calling and called telephone subscribers' stations and lines including the interconnection of lines, links and trunk circuits. This equipment is employed in common by all or a large plurality of the subscribers' lines connected to a large automatic exchange. Because of the complexity of the functions performed by this common complementary equipment, a large amount of apparatus is required in each complementary unit which is consequently expensive.

When a call comes into an automatic exchange, such equipment is automatically connected to the subscriber's line or seized by other circuits which are connected to or controlled by the subscriber's line. Many of these circuits must be seized and conditioned to properly respond before the subscriber can dial the called subscriber's station number or designation. Consequently, dial tone is not provided until numerous of these circuits have been seized and interconnected directly or indirectly with the subscriber's line and conditioned to respond to the dial or other calling signals transmitted from the subscriber's station. Upon the transmission of the dialing pulses or other calling signals the complementary equipment at the central office responds to these signals and stores representations of them and thereafter directs and controls the switching equipment in establishing a communication path to and over proper communication channels between the calling subscriber's station and line circuit and the called subscriber's station and line circuit.

As is also understood the time required to establish a path from the calling subscriber to the called subscriber is sufficiently long so that a number of such paths must be concurrently established to provide satisfactory service between the various subscribers. Consequently, it is necessary to provide duplications of the various units of a complementary equipment in number sufficient to handle the load expeditiously. The number of senders which is required, for instance, in a particular office is a function of the subscriber calling rate for that office and the length of time required by the sender to receive the dialled pulses and direct the call through the proper channels before the sender may be disconnected. In a busy office, as many as 200 to 300 senders may be required. The time a sender is connected depends on the length of time required by a subscriber to dial the called subscriber's station number or other identifying symbols which in the average may be of the order of 10 to 12 seconds.

In many cases the most important factor entering into the time a sender is connected to a line and employed in the establishment of a path through the switching equipment for each call is the length of time required for the subscriber to dial the number and the length of time required to respond to the trains of pulses thus transmitted by the subscriber because the time for directing the establishment of a communication path after the information has been dialled into the sender is relatively much less than the subscriber's dialing time. Thus, to appreciably reduce the sender holding time, it is necessary to reduce the time required by the subscriber to dial the calling signals and transmit them to the sender.

In order to reduce the number of senders to a minimum, it is desirable to provide a system in which the subscriber's station equipment may be preset and thereafter transmit impulses at high speed to the central office. In order to obtain high speed it is desirable that the impulses be transmitted simultaneously. Under these circumstances, the holding time of the sender is reduced. As a result with such an arrangement, a minimum number of senders, possibly three or four, would be all that would be required to handle satisfactorily the entire traffic load of a large switching office.

As a result of the present invention of an improved type of subscriber's station equipment in combination with improved code signaling, transmitting and receiving methods, apparatus and equipment at the central station, a very large reduction in holding time of the common equipment is obtained. As a result, the amount of such equipment required for satisfactorily handling a given traffic is greatly reduced.

Consequently, a more specific object of the present invention is a large reduction in the amount of control equipment required to effect connections in automatic, electromechanical and electronic telephone switching systems, in electromechanical and automatic telegraph switching systems as well as other types of communication switching systems.

Another object of this invention, is to provide signals which may be transmitted over toll lines and other circuits containing transformers, amplifiers and other elements which provide no path for the transmission of direct current but which do provide voice frequency telephone transmission channels or bands capable of transmitting voice frequency signals of either low frequency, intermediate frequency or high frequency, carrier current and radio signals. Calling signals in accordance with this invention may be also transmitted or paths formed of sections of different ones of said above types of paths or channels including repeaters, amplifiers; the terminal and interconnecting equipment, and other equipment employed in such systems. As is understood, ordinary dial pulses and signals having direct-current components cannot be satisfactorily transmitted over such communication paths or combinations thereof. The signals contemplated in the present invention may be satisfactorily transmitted over signaling circuits which provide no direct-current paths and include one or more sections of any or all of the above well-known types of communication paths.

In addition to reducing the amount of equipment required in effecting automatic switching of communication circuits and in establishing the interconnections of such circuits by reducing the time of transmission and reception of code signals, the present invention also effects a considerable saving in time and effort on the part of the subscriber in that it reduces the time required by him to send the necessary controlling signals and at the same time makes it possible for him to check the accuracy of his manipulation of his equipment, thus providing both faster, more reliable and more economical telephone service.

The invention is essentially a high speed signaling system which may be applied also in effecting the transmission and reception of the subject-matter of communications such as telegraph code signals, television signals, telephoto signals as well as special signals translated into code, if desired.

In the above-identified copending application of C. A. Lovell, Serial No. 1,471, which issued on November 3, 1953, as United States Patent No. 2,658,189, two high speed signaling systems based on orthogonal functions are described. In the present application the first of these two systems is described in greater detail and claimed in the claims appended hereto. The mathematical equations describing orthogonal functions and their relationship to the operation of the present system are fully presented hereinafter. The manner of implementing the various operations and functions to be performed is described in detail.

Another object of this invention is to provide a signaling arrangement employing a plurality of frequencies of alternating current and means for independently receiving and detecting the presence of each of these frequencies which does not require the use of frequency selective networks, filters and related types of equipment. Instead, high speed detecting circuits are employed which are arranged to respond to predetermined frequencies.

Another object of this invention is to provide an improved synchronized arrangement which accurately synchronizes the receiving equipment with the frequencies of the transmitted signals. As a result, the call receiving equipment at the central control stations will respond equally well to signals transmitted to it from a large plurality of signaling transmitters at subscribers' stations without maintaining the equipment at each and all of the subscribers' stations in exact synchronism with each other or with the equipment at the central exchange.

Another feature of this invention relates to equipment for determining an interval of time which is an integral multiple of the time of a cycle of each of a plurality of different signaling frequencies.

Other features of the invention relate to other control, steering, sequence and checking circuits as described hereinafter.

The invention may be more fully understood from the following description when read with reference to the accompanying drawings in which.

Figure 2:
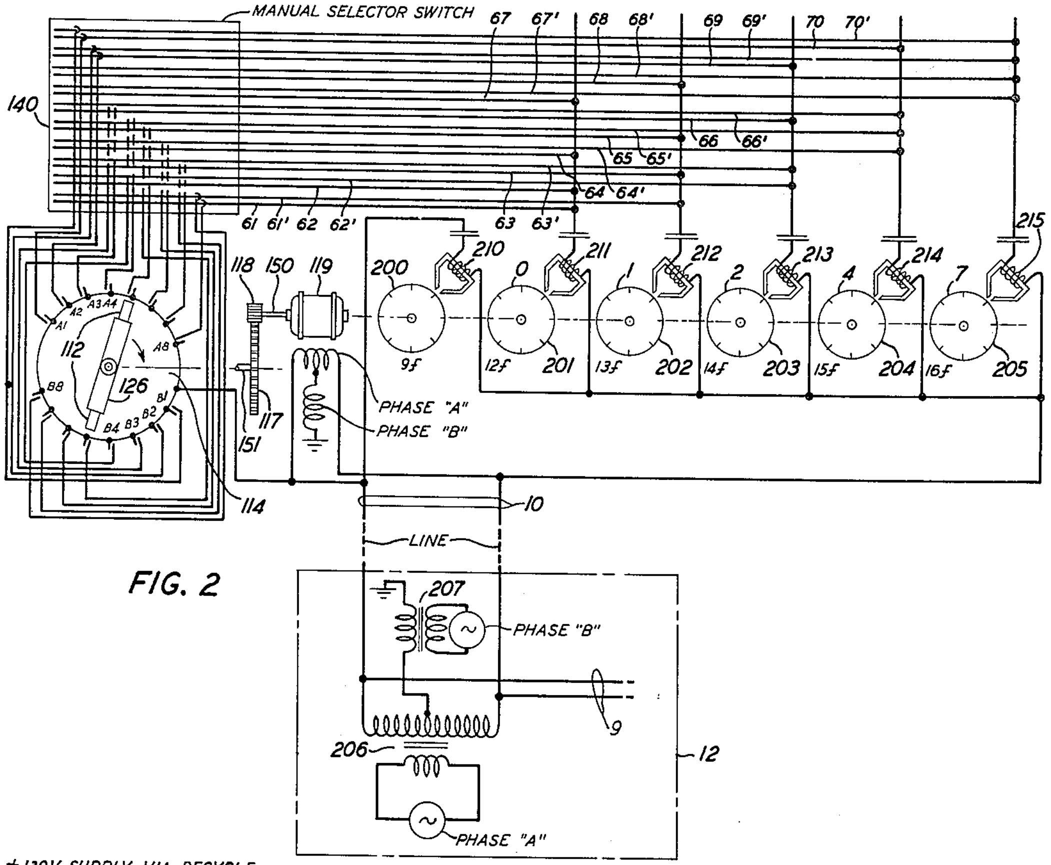
Figure 18:
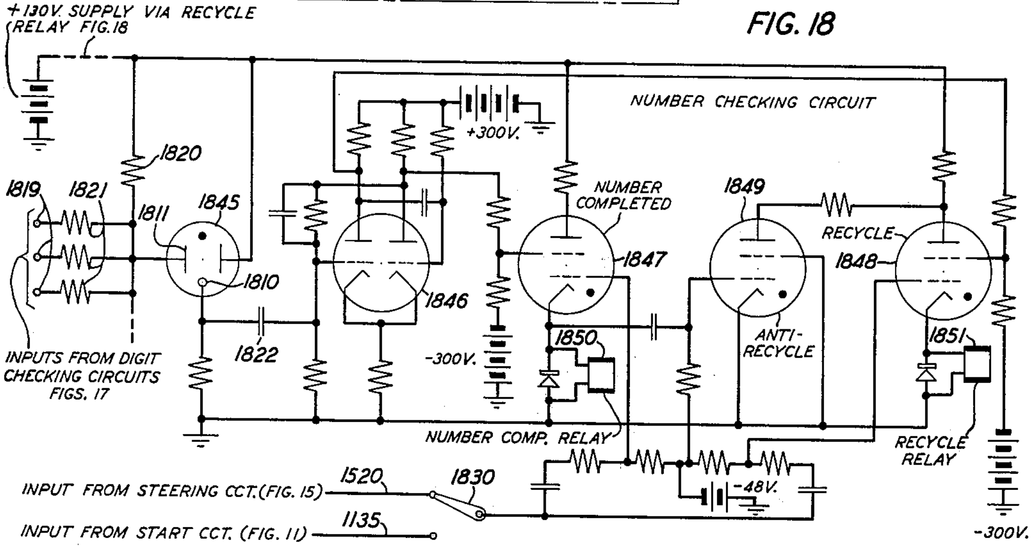
Figures 3, 4:
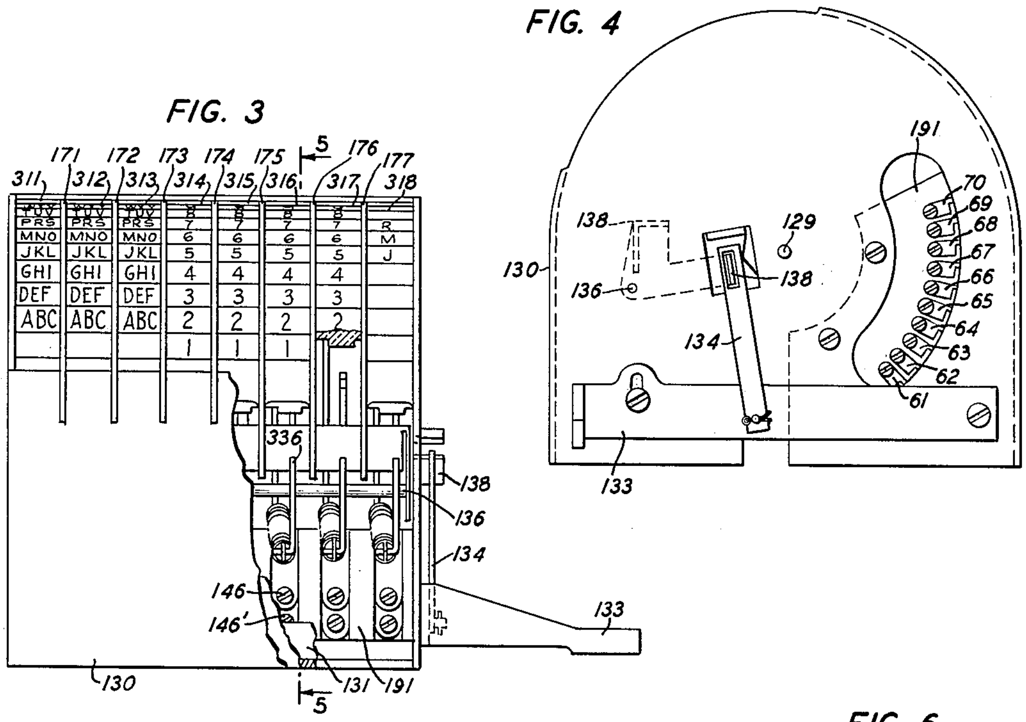
Figure 5:
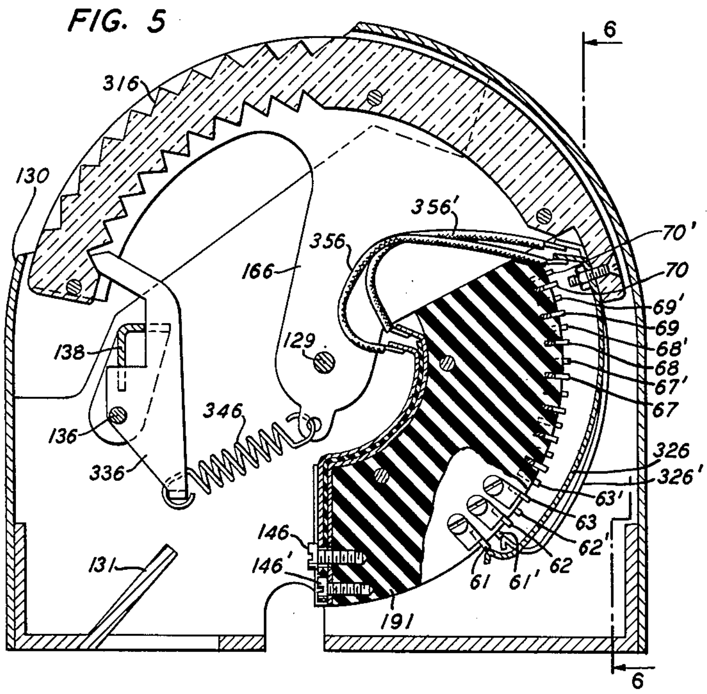
Figure 6:
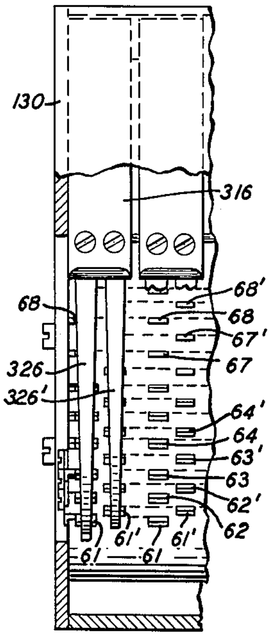
Figure 7:
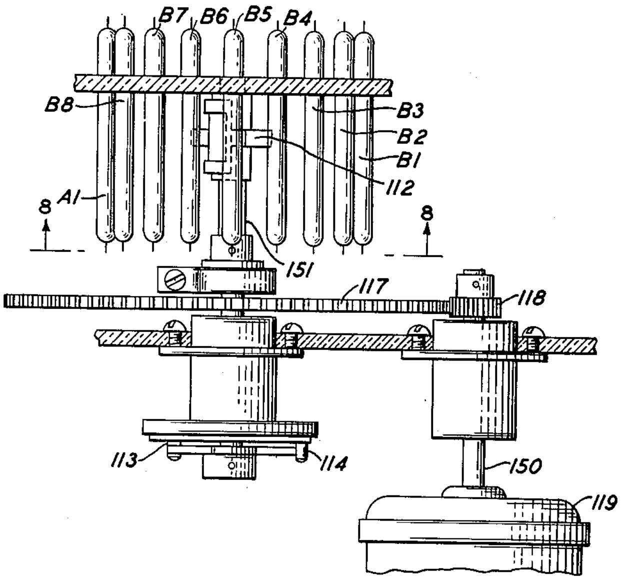
Figure 8:
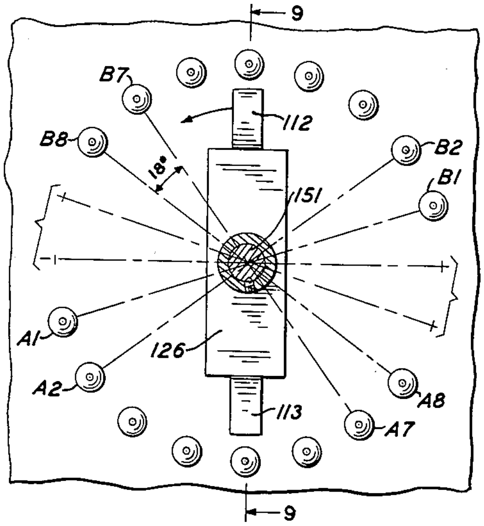
Figure 9:
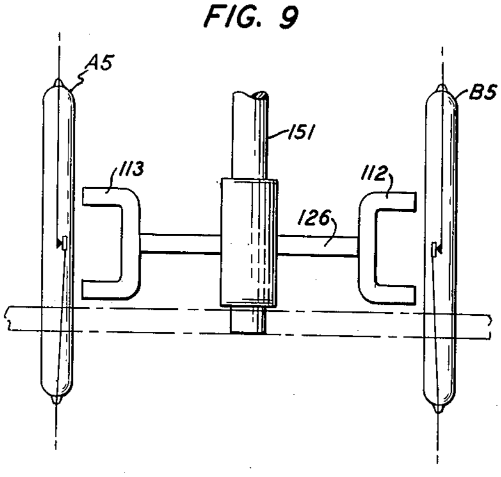
Figure 10:
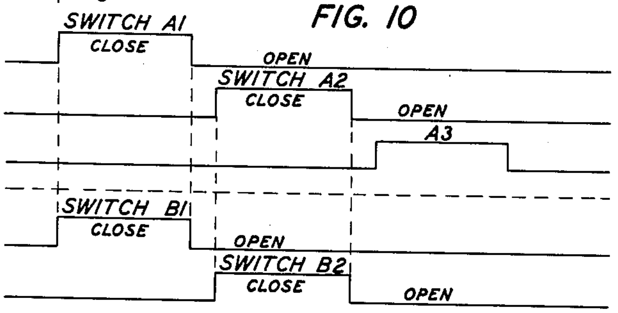
Figures 11, 23:
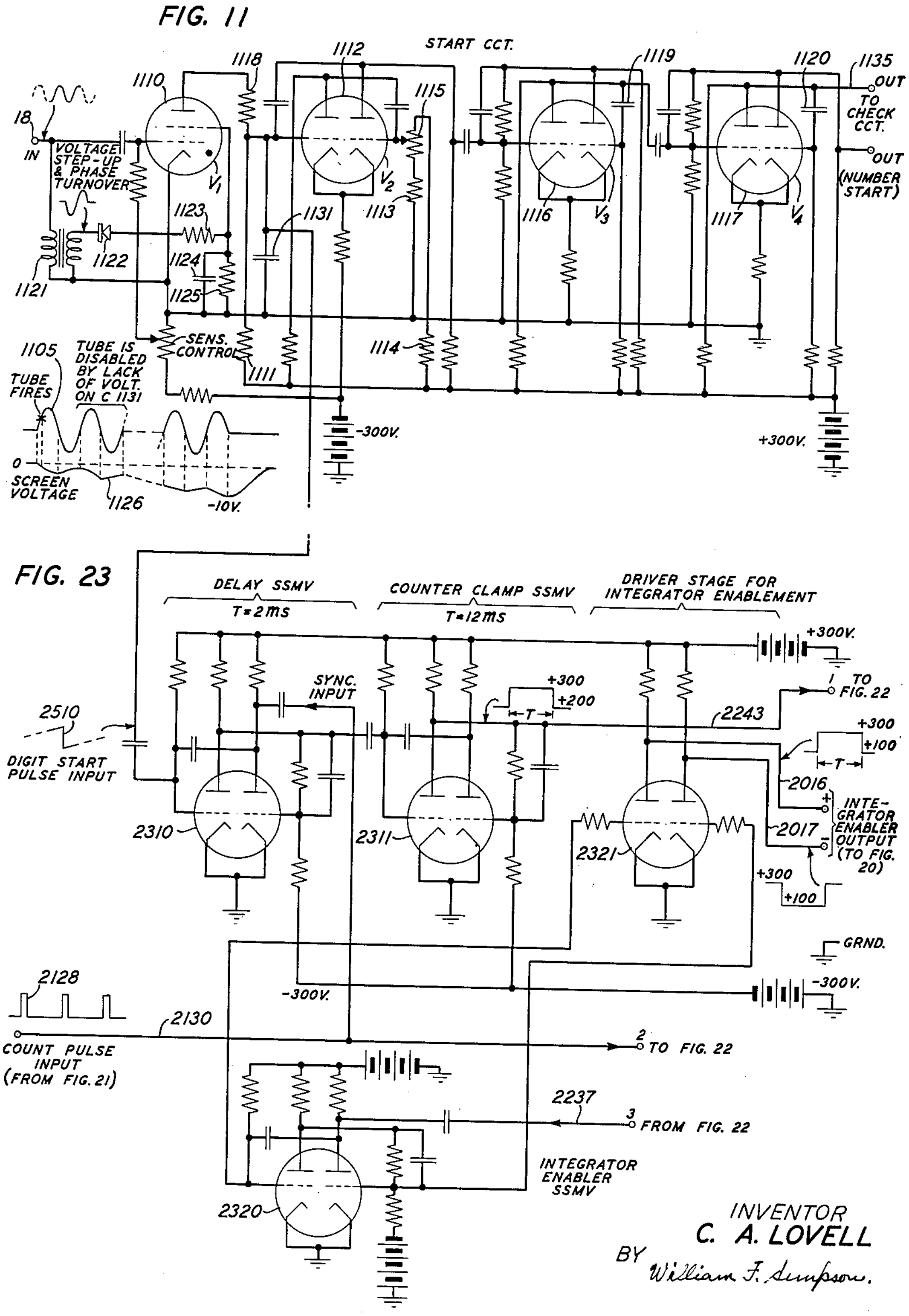
Figure 12:
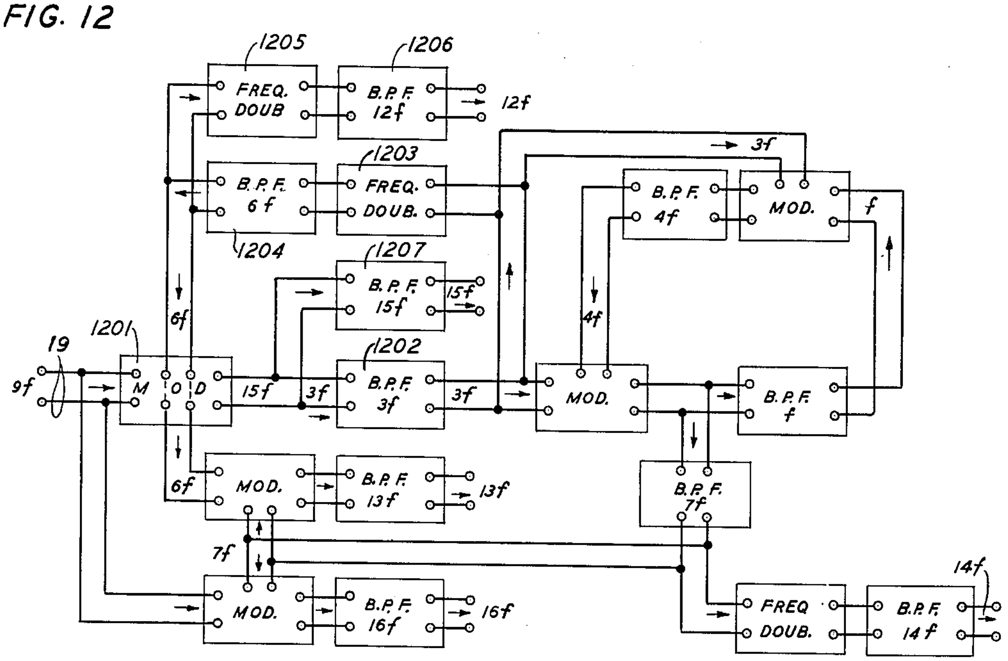
Figure 21:
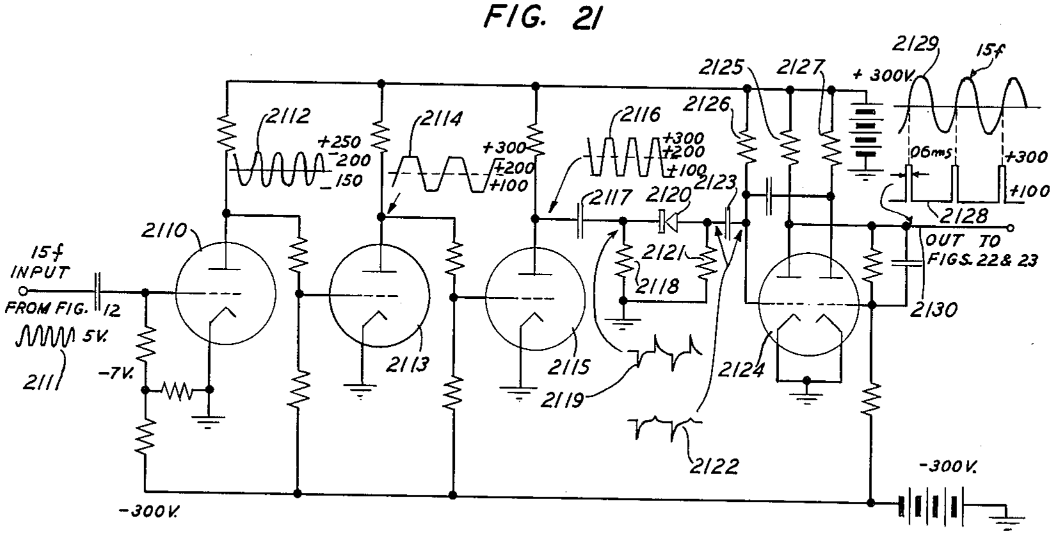
Figure 13:
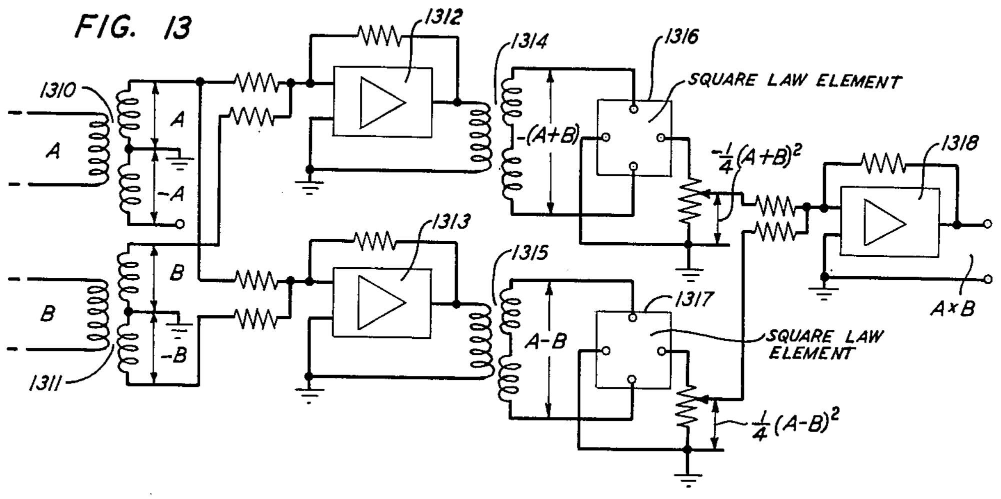
Figure 19:
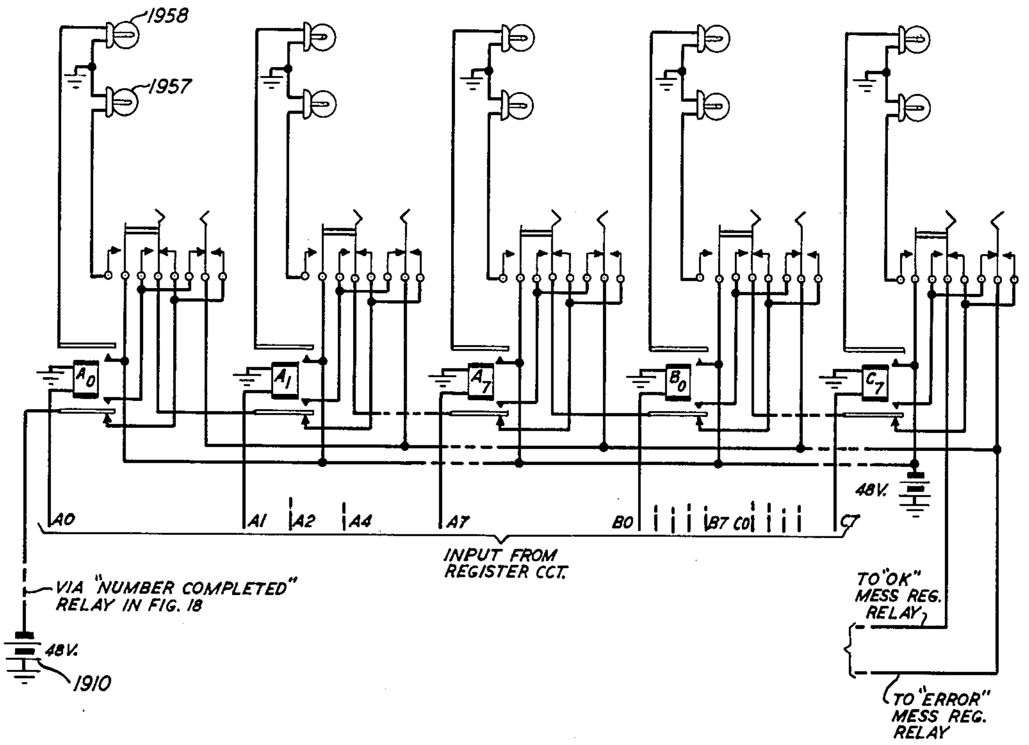
Figure 14:
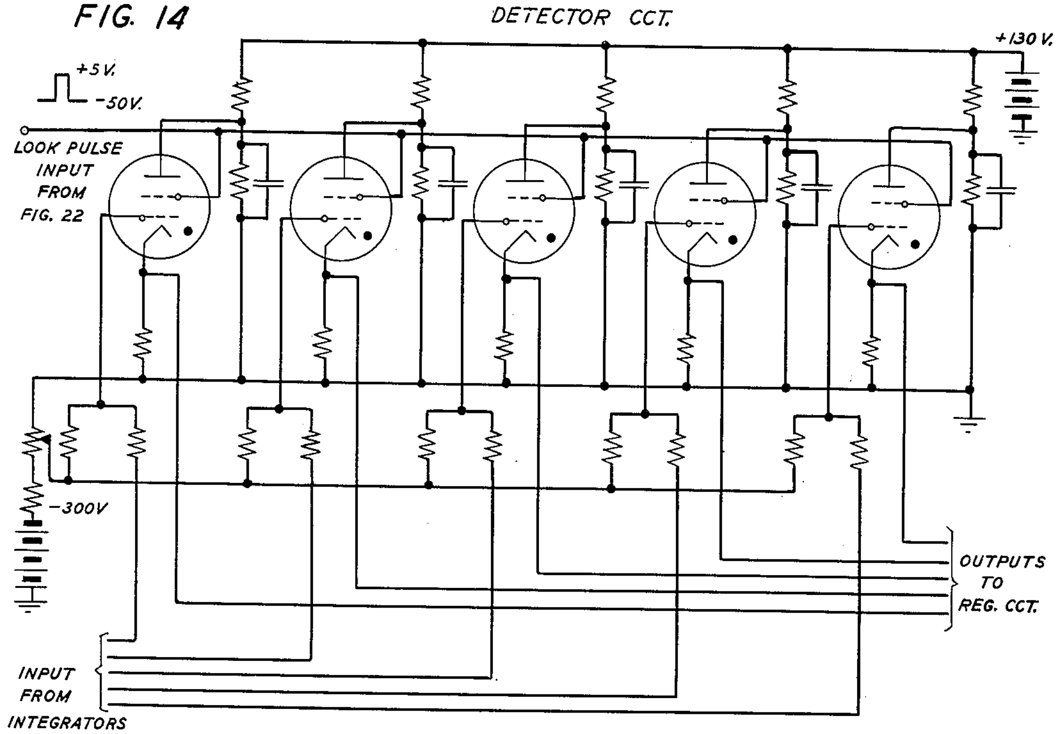
Figure 15:
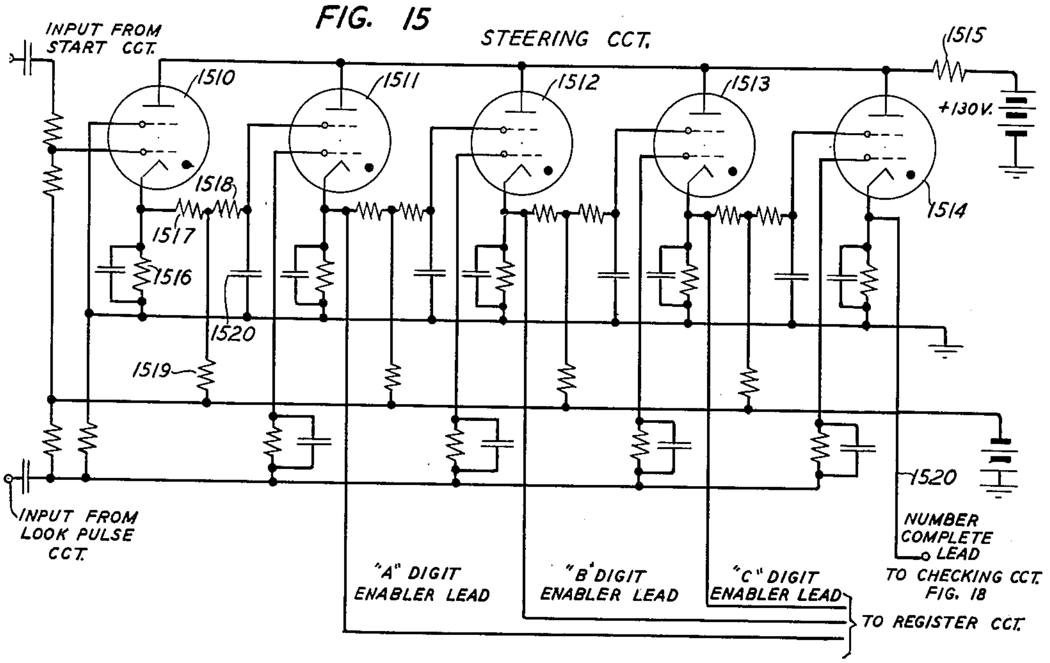
Figures 16, 17:
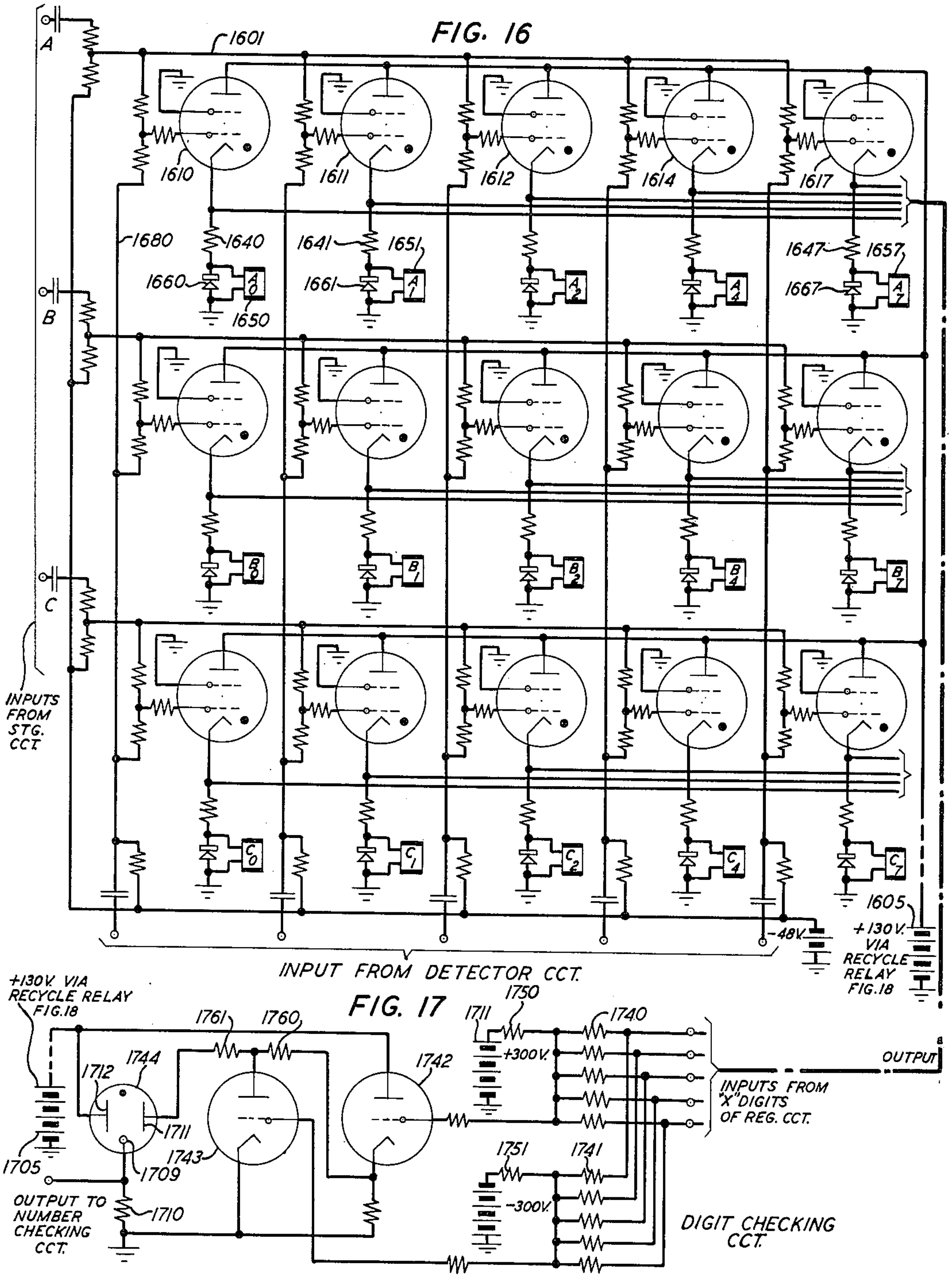
Figure 20:
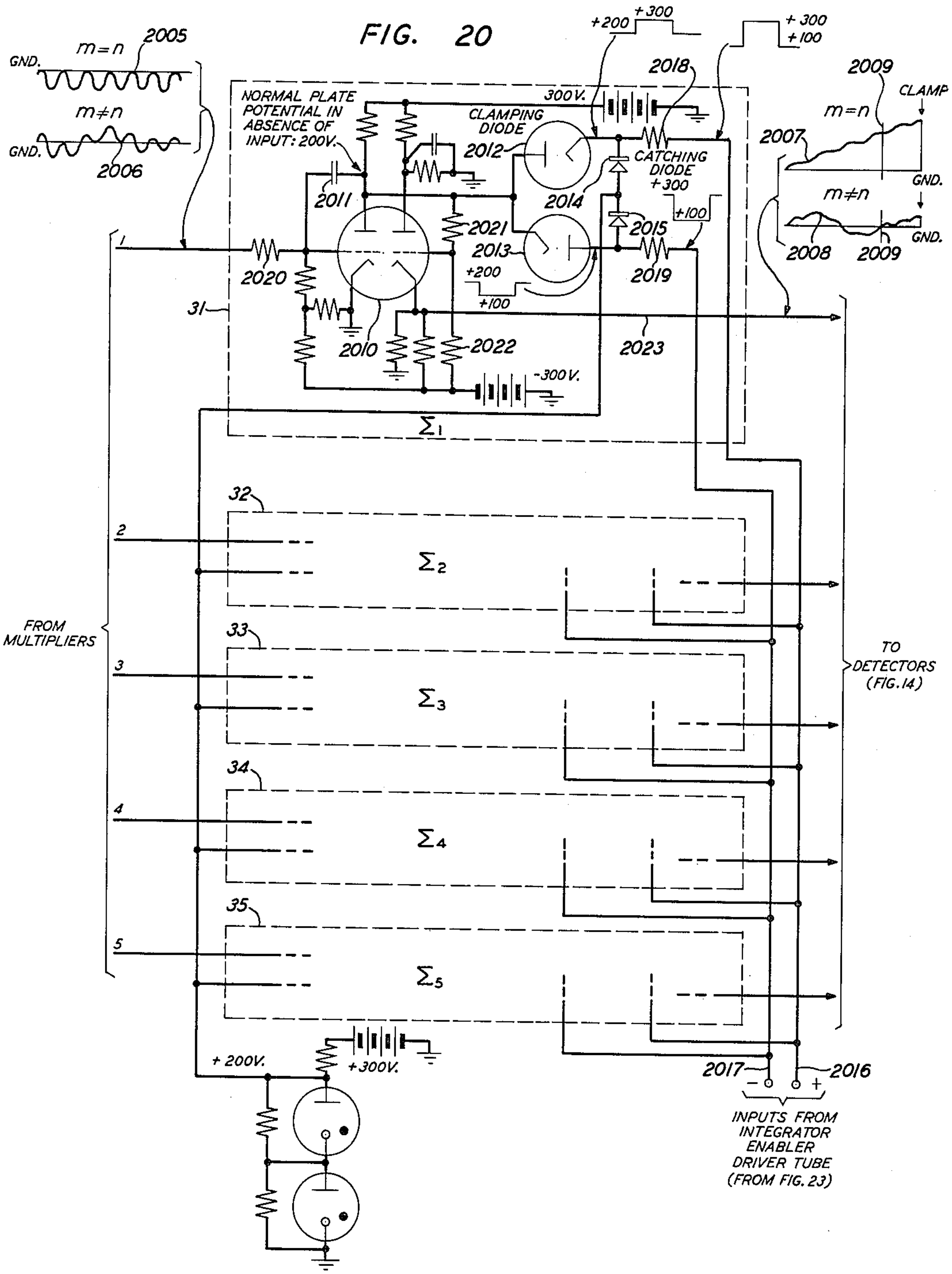
Figure 22:
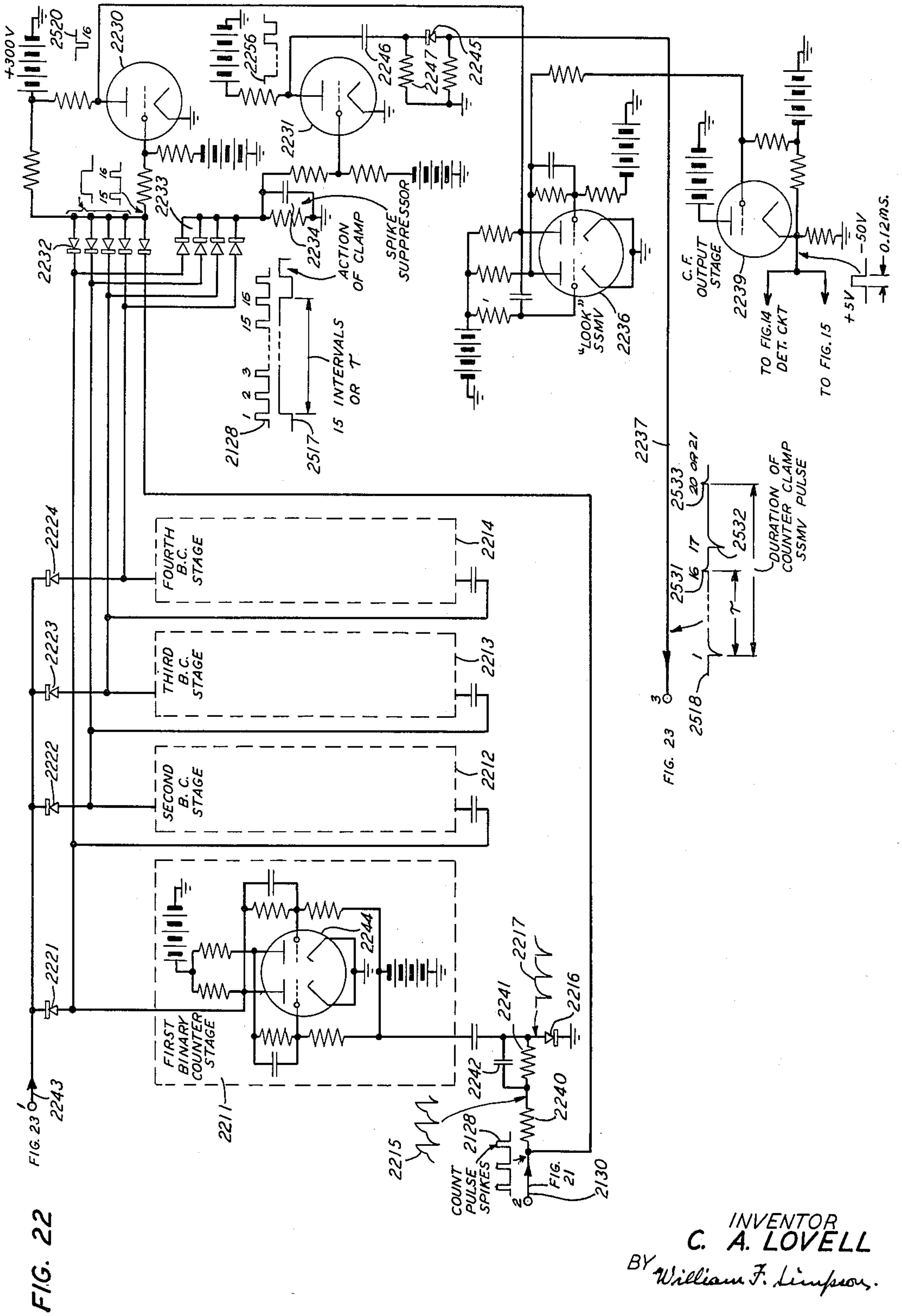
Figure 24:
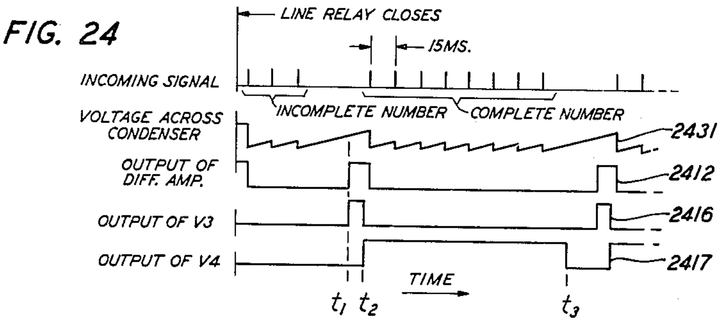
Figure 25:
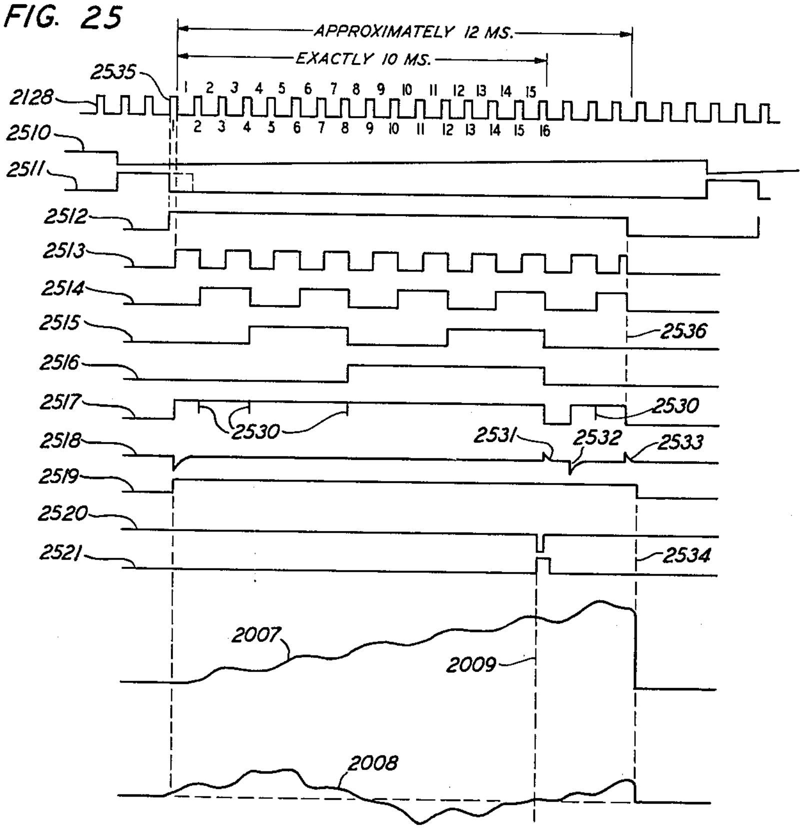

Figs. 2 through 10, inclusive, show details of a subscriber's station and illustrate the mode of operation thereof, in which:

Fig. 2 shows the various circuit connections at the subscriber's station, the subscriber's line and the source of polyphase alternating current connected to the subscriber's line at the central station;

Fig. 3 shows the front elevation of manually selectable elements or dials at the subscriber's station;

Fig. 4 shows the end view of Fig. 3;

Fig. 5 shows a sectional view of Fig. 3 along line 5—5 of Fig. 3;

Fig. 6 shows a partly broken away view of Fig. 5 along line 6—6;

Fig. 7 shows details of a distributor arrangement provided at the subscriber's station;

Fig. 8 shows a view of Fig. 7 along line 8—8;

Fig. 9 shows a sectional view of Fig. 8 along line 9—9;

Fig. 10 shows a graph illustrating the closure of the contacts of the distributor arrangement;

Figs. 11 through 25, inclusive, show details of the various component circuits and equipment at the central station which respond to the signals transmitted from the subscriber's station, in which:

Fig. 11 shows details of a start circuit;

Fig. 12 shows the manner in which the controlling incoming frequency is employed to generate a plurality of other and additional control frequencies;

Fig. 13 illustrates the details of a circuit for multiplying two currents of different frequencies together;

Fig. 14 shows circuits of a plurality of detectors for detecting the presence of certain frequencies;

Fig. 15 shows a steering circuit;

Fig. 16 shows a plurality of register circuits for registering the identity of symbols or numerals represented by the various signaling currents;

Figs. 17 and 18 show in detail certain check circuits;

Fig. 19 shows a comparator circuit for checking the operation of the system in response to certain test signals;

Fig. 20 shows details of an integrating or summing circuit;

Fig. 21 shows an amplifying pulse shaping and pulse generating circuit;

Fig. 22 shows certain counting coincidence and timing circuits;

Fig. 23 shows certain delay circuits employed to control the operation of the system;

Fig. 24 shows graphs of the wave form of the start circuit shown in Fig. 11; and Fig. 25 shows graphs of the wave forms at various points in the system, more particularly at points in the counting, timing and integrating circuits.

In accordance with an exemplary embodiment of the improved signaling arrangement set forth herein, use is made of and advantage taken of certain properties of orthogonal functions. In the usual multifrequency signaling arrangements of the prior art various filters are required at the receiving station, and sometimes at the transmitting station, to separate the currents of different frequencies and thereafter to recognize the presence or absence of the different frequencies. Such an arrangement requires a number of complicated filters which in themselves are expensive. Furthermore, it takes an appreciable amount of time for the currents through these filters to build up to an appreciable value approaching their steady state conditions. The sharper the filters, which is to say the greater the amount of discrimination provided against unwanted frequencies and other noise disturbances, the longer is the time required for the output of the filters to approach a steady state value or to approach a value which may be employed to control a detecting and other recording circuits.

A given set of normalized time functions, $\varphi_1(t)$, $\varphi_2(t)$, . . . $\varphi_n(t)$ are said to be orthogonal over the time interval $\tau$ if $$\int_0^\tau \varphi_i(t).\varphi_j(t)dt=0,\ i\neq j \quad (1a)$$

$$\int_0^\tau \varphi_i(t).\varphi_j(t)dt=1,\ i=j \quad (1b) \qquad (1)$$

Sinusoids of various frequencies provide a common and familiar example of one class of functions satisfying the above Equation 1 where the period $\tau$ of orthogonality may be any value which embraces an integral number of periods or cycles of each of the frequencies under consideration.

From the above equations it is apparent that the presence or absence of any signaling frequency may be readily determined if the received wave is multiplied with a locally generated current having a frequency the same as the signaling frequency in question. If the received wave has frequencies other than the frequency in question and thus frequencies other than the frequency of the locally generated wave, the output, when the product is integrated over a suitable time interval $\tau$ will be zero. On the other hand, if the signaling wave has among it constituents the same frequency as the frequency of the locally generated wave, then the product, when integrated over a suitable time interval $\tau$, will not be zero, but instead will be a maximum.

Where more than one signaling frequency is employed a corresponding number of locally generated currents having the various signaling frequencies may be each multipled with the received signaling wave independently at the same time. When the received signaling wave has a frequency corresponding with the frequency of the locally generated wave, then the resultant of the integration of the product over the period $\tau$ will be a maximum. Conversely, when the signaling frequency does not contain the corresponding locally generated frequency, the result of the integration over the period $\tau$ will be a minimum which will be substantially zero. It is thus possible to readily and simultaneously determine the presence or absence of currents of each of a plurality of frequencies without the use of reactive filter networks and in a much shorter interval of time than the time required for the output of said networks of the designs customarily employed to become sufficient to reliably indicate the presence of the corresponding signaling frequency.

In the exemplary embodiment set forth herein five different signaling frequencies are employed, two at a time, to represent each of the numerals 0 to 9. Such code combinations two out of five different signaling currents are described in greater detail in Patent 2,290,986 granted to J. B. McKim, July 28, 1942. In addition, a sixth frequency employed for synchronizing purposes is continuously transmitted during the synchronizing interval.

The use of the sixth frequency eliminates the necessity of synchronizing the local oscillator or oscillators at the receiving station. Instead, the sixth frequency is employed to derive currents of the various other signaling frequencies. In this manner the problem of synchronizing the receiving oscillator with the oscillators at each and all of the outlying stations or of maintaining the oscillators in all of the outlying stations as well as the central station in a substantially exact synchronism is avoided.

Thus, in accordance with the present invention, short pulses of code combinations of two out of five different frequencies are transmitted in succession, each pulse or wave-train of two-frequency energy representing one of the numerals or symbols of a called telephone subscriber's station designation. After all of the numerals or other symbols of the called subscriber's station are transmitted, no signals are transmitted for an interval which, in the exemplary embodiment of the invention set forth herein, comprises the time interval which would normally suffice to transmit two pulses of two-frequency energy representing two numerals or symbols. The above-described series of pulses representing the complete multidigit number, followed by a blank or silent interval of two digit periods, is continuously repeated as long as desired.

The power for energizing and actuating the transmitting equipment at the subscriber's station is transmitted from the central station to the subscriber's station over the subscriber's line in the exemplary embodiment of the invention set forth in detail herein. Of course, when desired this power may be supplied locally or in any other suitable manner from any intermediate or more distant point.

While the system described in detail herein is arranged to employ sinusoids of different frequencies, it is to be understood that currents having other wave forms satisfying the orthogonal conditions of Equation 1 may be equally well employed and the circuits operated in substantially the same manner as set forth herein.

Figure 1:
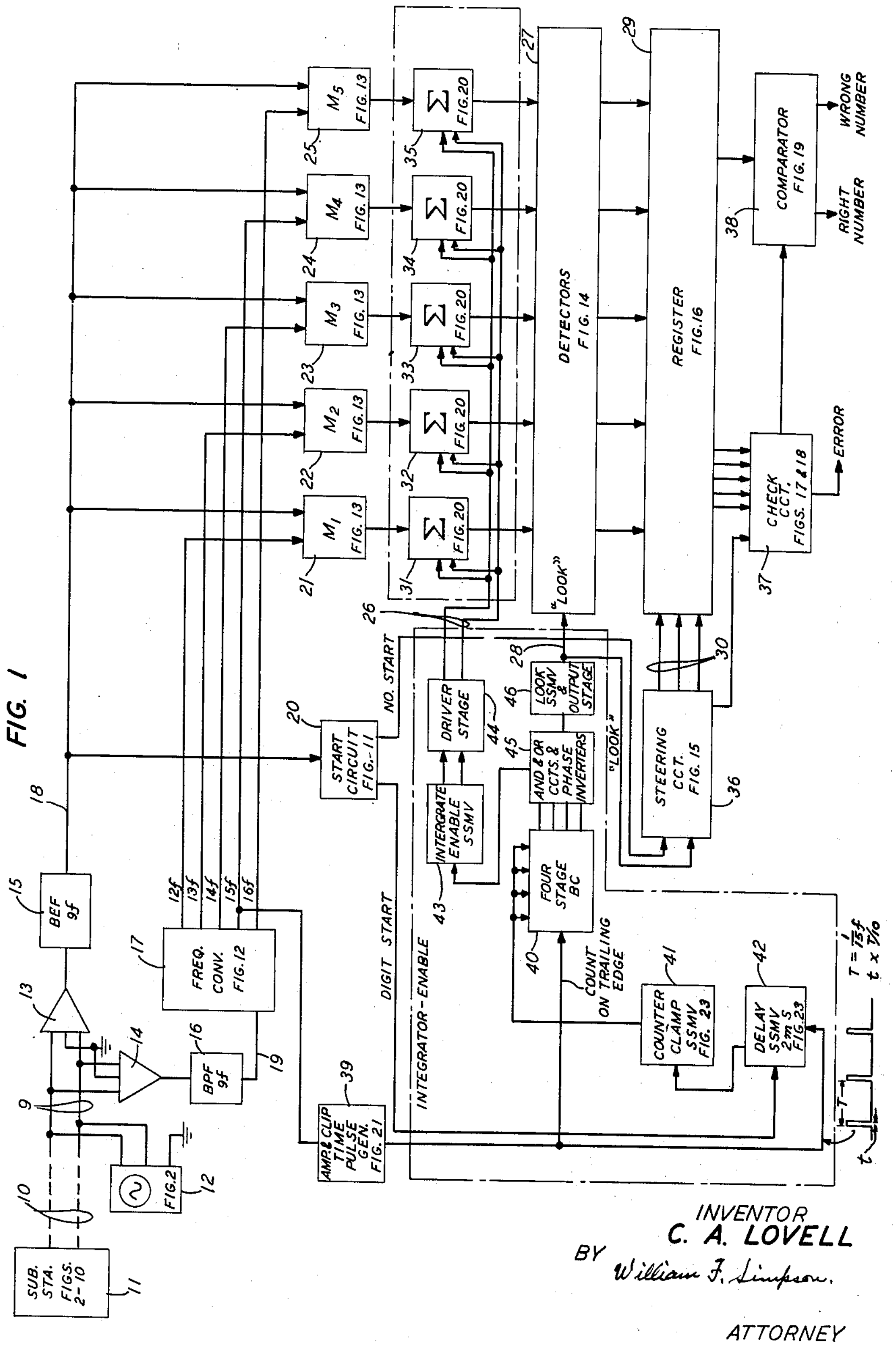
Fig. 1 shows in outline form the various circuit components of an exemplary system embodying the present invention.

Fig. 1 shows in outline form the various circuits and components of an exemplary system embodying the improved signaling and frequency selecting arrangement in accordance with this invention. A typical subscriber's line is designated 10 in Fig. 1 and extends between the subscriber's station 11 and the central station which comprises the remainder of Fig. 1. The subscriber's station includes apparatus shown in Figs. 2 to 10 of the drawing which comprises a plurality of sources of frequency, a manual selecting arrangement and a distributor. The distributor and the sources of frequency as shown in Fig. 2 are driven by a motor actuated by power received over the subscriber's line. A source of power is represented at 12 in Fig. 1 and may be applied to the subscriber's line in any suitable manner such as shown in Fig. 2 and described hereinafter. This source of power may be connected through suitable filters if desired to prevent undesirable interaction between the source of power and the signals and signaling currents. Characteristics of the source of power and the signaling may be chosen such as to not require special separate filter elements and they need not be supplied.

The subscriber's line 10 is shown in Fig. 1 as extending between the subscriber's station and the terminal equipment at the central switching station. It is to be understood that suitable types of switching equipment may be interposed between the subscriber's line and the call receiving equipment at the central station and also between the subscriber's line and the call signaling equipment at the subscriber's station. Inasmuch as this switching equipment operates in its normal and usual manner in combination with the improved switching system described in the exemplary embodiment of the invention set forth herein, it is unnecessary to further describe or refer to this switching equipment.

During the signaling interval the subscriber's station transmits an alternating current or tone for synchronizing purposes which tone is transmitted continuously from the subscriber's station over line 10 to the central switching station. As shown in the drawings this tone is assumed to have a frequency $9f$ where $f$ may be any suitable frequency such as 100 cycles per second. Likewise, the other signaling frequencies are assumed to be 12f, 13f, 14f, 15f and 16f where f has the same value as before. Thus, where f is 100 cycles per second then the synchronizing and signaling frequencies are 900, 1200, 1300, 1400, 1500 and 1600 cycles. These frequencies all lie within the voice frequency range and thus may be readily transmitted over all of the usual voice frequency communication paths or channels.

At the central station subscriber's line 10, in addition to being connected to a source of polyphase alternating current, is also connected, through suitable switching equipment, referred to above, to two amplifiers 13 and 14. The output of amplifier 14 is connected to a band-pass filter 16 which selectively passes energy of frequency 9f to a frequency conversion circuit 17, while substantially eliminating energy of all other frequencies, in particular energy of frequencies 12f, 13f, etc. The output of amplifier 13 passes through a band elimination filter 15 which eliminates energy of the frequency 9f from its output. Thus, the other frequencies 12f through 16f, inclusive, are transmitted over conductor 18 while frequency 9f is transmitted over conductor 19. Frequency 9f is applied to a frequency converter, 17, which derives the other frequencies 12f through 16f from this frequency 9f. The frequencies and the phases between the various frequencies 9f and 12f through 16f are generated with predetermined relationships between them which relationship may be the same or bear a fixed relationship with the corresponding frequencies transmitted from subscriber's station. Likewise, if the signaling currents have been transmitted from another subscriber's station, then the frequencies 9f, and 12f through 16f obtained under control of frequency 9f will have the phase and frequency relationship corresponding to the currents generated at this other subscriber's station. It is thus unnecessary to attempt to maintain any equipment at any of the subscriber's stations or at the central station in synchronism with each other.

A group of five multiplying circuits 21 through 25, inclusive, is provided. The output of the band elimination filter 15 extends over conductor 18 to each of these multiplying circuits and provides one input for each of these circuits. Likewise, each of the outputs of the frequency converter circuit 17 extends to one of the multiplying circuits. Thus, multiplying circuit 21 is supplied with a current 12f from the frequency converter 17 and also the incoming signals over conductor 18. The multiplying circuit 22 is supplied with frequency 13f and the incoming signal frequencies. Likewise, each of the other multiplying circuits is supplied with one of the locally generated frequencies from the frequency converter and with the incoming signals. Consequently, if a frequency 12f is present in the incoming signals, when this signal is multiplied with the local frequency 12f by the multiplying circuit 21 and integrated by the integrator circuit 31 over a predetermined time interval $\tau$, the output of the integrator circuit will be a maximum. On the other hand, if the incoming signal does not include a current having a frequency 12f then the output of the intergrator circuit 31 will be substantially zero, or a minimum, independently of which ones or how many of the other frequencies are present in the applied signal. The other multiplying circuits together with the associated integrator circuits similarly determine the presence or absence of the respective frequencies in the applied signals. As indicated above, the integrator circuits 31 through 35, inclusive, are each supplied from the corresponding multiplying circuits 21 through 25 and in addition are supplied with enabling or timing information over conductors 26 which times the interval $\tau$ during which the integration is to take place. Thus, the integrators are enabled at a time determined by the control circuits and perform the integration for a predetermined interval, after which time the outputs of these circuits are employed to control the detector circuits 27.

In the above description of the operation of the multiplying, integrating and detecting circuits it has been assumed that none of the signaling frequencies 12f through 16f, arriving over the various subscribers' lines will have experienced a difference of phase shift of any amount approaching 90 degrees with reference to that experienced by the accompanying synchronizing frequency 9f over the same subscriber's line. In other words, if it is assumed that each of these frequencies has a particular phase relationship with respect to the synchronizing frequency 9f for short lines having substantially no phase delay or phase distortion, then these same frequencies must not have their phase relationship with respect to the synchronizing frequency disturbed or altered by more than about 60 degrees, for example, for subscribers' lines having the greatest phase distortion. In other words, the time of transmission of each of the signaling frequencies over a given line should be substantially the same, the tolerable variation being an amount considerably less than the time of a quarter cycle of the various signaling frequencies. If the locally generated frequencies do not bear the proper phase relationship with the arriving synchronizing frequency, then phase shifting devices must be included in the frequency converter 17 to properly adjust the phase of each of the generated frequencies derived from frequency 9f, so that the phase of the generated frequencies will be substantially the same as the phase of the corresponding signaling frequencies as they arrive and are applied to the multiplying circuits 21 through 25.

The output of the integrating circuits is employed to control detector circuits 27 which detector circuits, in addition to receiving the output from the integrating circuits 31 through 35, inclusive, also receive gating or timing pulses over conductor 28. The outputs of the detector circuits are employed to set a succession of register circuits 29 and the register circuits are themselves energized or rendered effective, one after another under control of a group of synchronizing signals over leads 30 from the steering circuit 36. The information registered in the register circuits may then be employed to control switching equipment which will establish the necessary or desired paths to the calling subscriber's line. In addition, check circuits 37 may be employed to check the registration in the register to insure that two-out-of-five frequencies are present in each signaling group representing a numeral in a particular order or position of the called number. In the case of test signals, a comparer circuit 38 may be employed to check the accuracy of registration of each predetermined numeral registered in the register circuit.

The three leads 30 shown in Fig. 1 from the steering circuit to the register circuits represent any suitable number of such leads each of which is usually individual to, and employed to control, one stage of the register circuit for registering signals representing one numeral. Thus, a complete subscriber's calling designation may be registered in the register under control of the various control and common circuits of the arrangement described herein.

When it is desirable to further economize on equipment when the signals representing the called subscriber's number or station designation are repeatedly transmitted from the subscriber's station, a lesser number of register stages and thus a lesser number of leads 30, may be provided at the first switching station and also at each of the succeeding switching stations through which the communication path between the calling and called subscriber is established. Thus, the three leads 30 as shown in Fig. 1 under these circumstances may comprise the leads necessary to control the registration of only the office code at the first office. After the path has been established through the equipment at the first office then signals representing the complete number of the called subscriber's station will continue to be transmitted from the called subscriber's station through the first switching center to the second switching center where the same or other portions of the called subscriber's number may be employed and at which place a corresponding number of leads 30 will extend to the register circuits to record the proper portions of the number in the proper register circuits.

In addition to the above-described circuits shown in Fig. 1, additional control circuits are provided which circuits include the amplifying and pulse-shaping circuit 39 which is supplied with local frequency 15*f*. This pulse-shaping circuit 39 produces a pulse for each cycle of the applied alternating current. These pulses are applied to the four-stage binary counter 40 which in turn is employed to control the detector circuits 14 through the gating circuit 45 and the pulse-forming and shaping circuit 46 so that the detector circuits 27 will respond to the output of the integrating circuits 31 through 35 at the end of the interval $\tau$. The four-stage binary counter circuit 40 is connected through the gating circuits 45 and the integrating control circuit 43 and the driver circuit 44 to the integrating circuits 31 through 35 to control the time interval during which integration is performed by each of these circuits. In addition, a start circuit 20 is arranged to provide an output pulse when any of the signaling frequencies are applied to conductor 18. The start circuit 20 is also arranged to detect the pause between signals representing each of the complete multidigit subscriber designations and thus recycle the steering circuit so that the received signals control registration in the proper register circuits.

Thus, the subscriber at station A will manually actuate his apparatus to set up an indication of the called station designation; he then has an opportunity to visually check the correctness of the setting for the entire designation and can alter it if he so desires. When satisfied of the correctness of the manual setting, the subscriber, by actuating another switch control, such as the switchhook, for example, as hereinbefore mentioned, can cause his apparatus thereupon to automatically and repeatedly transmit a series of pulses representing the complete called subscriber's station designation. The subscriber having thus initiated a call, the equipment at the central office will respond to the calling signals and register them in register 29 in the manner described above, each of the numerals of the called subscriber's designation being represented by a code group of two out of five different signaling currents each having a different frequency. In addition, steady state synchronizing frequency of still a different frequency is transmitted from the subscriber's station during the entire signaling interval. Circuits at the central office respond to these currents in a novel manner and determine which two of the five frequencies are present in each pulse and cause this information to be recorded in a register circuit for use in establishing a connection from a calling subscriber's line to a called subscriber's line.

*Subscriber's station*

As indicated by rectangle 11 on Fig. 1 the subscriber's station is shown in greater detail in Figs. 2 through 9, inclusive. Fig. 10 shows the manner in which certain switches at the subscriber's station operate. As shown in Fig. 2 the subscriber's line 10 extends from a source of polyphase alternating current at the central station shown within the rectangle 12 to equipment at the subscriber's station. This line circuit also extends over conductors 9 to other equipment at the central station such as amplifiers 13 and 14 and band-pass filter 16 and band elimination filter 15 described above with reference to Fig. 1. Suitable switching facilities may be provided between line conductors 10 and the source of polyphase currents and also between conductors 9 and amplifiers 13 and 14.

As indicated in Fig. 2, two-phase alternating current is employed with phase A connected between the individual conductors of line 10 by means of transformer 206 while phase B is connected over a so-called simplex circuit between both line conductors and ground wherein the secondary winding of the transformer 206 serves as the simplex coil. As shown in the drawing, in order to secure the desired voltage, transformer 207 may be connected between the source or phase B and the line conductors.

At the subscriber's station the line conductors extend to the respective phase windings of the motor 119, phase A of motor windings being connected between the line conductors and phase B being connected between the center point of the windings of phase A and ground. Thus, the phase winding A is also employed as the simplex coil at the subscriber's station. When two-phase alternating current is applied to the line conductors in the manner described above at the central station, motor 119 to caused to operate and drive shaft 150. This shaft is coupled by means of gears 118 and 117 to shaft 151 driving the distributor element which will be described hereinafter.

Shaft 150 also drives rotors for generators 200 through 205, inclusive. These discs may be tone wheels having teeth or pole pieces, they may include permanent magnets, or they may be similar to a magnetic recording element wherein the surface of magnetic material has been locally magnetized. Each of the discs is provided with a pick-up coil 210 through 215, inclusive, in which the signaling frequencies 9*f* and 12*f* through 16*f*, inclusive, are induced as motor 119 rotates. The exact frequency generated or induced in each of the windings of these pick-up coils is a function of the speed of rotation of the motor 119 and of the number of teeth or magnetic irregularities equally spaced around the circumference of the discs. Since all discs rotate at the same speed, the number of teeth or magnetized spots on the various wheels must exist in the ratios indicated by the numbers 9*f*, 12*f*, 13*f*, etc. The motor may be either a synchronous motor or an induction motor the speed of which is close to synchronous speed. Thus through the proper choice of motor speed and number of teeth or magnetized spots on each wheel, the desired frequencies will be induced in the various pick-up coils and will be maintained relatively constant.

Since alternating current or tone generators of the type shown in Fig. 2 are well known and their mode of operation well understood, it is not necessary to describe the operation of these devices in any greater detail. It is noted that one terminal of each of the coils 210 through 215, inclusive, is connected to one side of the signaling conductor extending to the central station. The other terminal of the winding of coil 210 is connected through a condenser to the other conductor of the subscriber's line. The other terminals of coils 211 through 215 are connected through condensers to terminals of a manual selector switch 140. From 140, connections extend to the distributor device 114, then to the other terminal of the subscriber's line.

The manual selector switch 140 is provided with a pair of contacts for each symbol or denominational order of the number or other designation of the called subscriber. In setting this device in accordance with the identification of the desired called station, connections are made to two conductors from the generators 211 through 215, inclusive. These connections extend circuits to corresponding ones of the contacts A1 through A8 and B1 through B8 and then to the subscriber's line.

If tone generator 201 is assigned the numeral 0, tone generator 202 the numeral 1, generator 203 the numeral 2, generator 204 the numeral 4 and generator 205 the numeral 7, then a so-called "additive code" results. It will be observed that the conductors 61 and 61′ are connected to generators 201 and 202, namely, 1 and 0, which when added represent the numeral 1; the conductors 62 and 62' are connected to tone generator 0 and 2, thus representing the numeral 2 on the same basis. Likewise, the other conductors connected to other ones of the tone generators representing the different numerals. Conductors 70 and 70' are connected to the number 4 and number 7 tone generators, i. e., number 204 and 205 representing the numeral 0. By setting the various contacts controlled by the finger wheels of the selector switch 140 in accordance with the subscriber's designation, the desired frequencies are selected in pairs for transmission, representing the different numerals. Then the particular numerals represented by the different finger wheels are transmitted in succession under control of the distributor device 114.

The manual selector device 140 is shown in greater detail in Figs. 3, 4, 5 and 6. In the embodiment of this selector switch shown in Figs. 3, 4, 5 and 6 a case or housing 130 is provided for enclosing the mechanism. This device is provided with a group of eight finger wheels designated 311 through 318, inclusive, in Fig. 3, each of which is provided with ten notches. In the exemplary embodiment set forth in the specification, it is assumed that the first three finger wheels on the left 311, 312, and 313 are set in accordance with the central office code of the called subscriber's station. Inasmuch as this code is frequently represented by letters, the letters corresponding to the various positions of these finger wheels are shown in the drawing. While the drawing does not show numerals also designating these different notches, it is to be understood that numerals may be added to designate the different positions of these finger wheels. The next four finger wheels or dials are designated with numerals, while the last one on the right is again designated with the letters of the alphabet representing the different parties' stations on party lines. Here again, the notches may also be designated by numerals, if desired. Likewise, letters or other symbols may also be shown on the notches of the 314 through 317 dials or finger wheels starting from the left.

A release lever 133 is provided which is accessible to the user or operator. The selector dials or finger wheels are made of non-conducting material such as hard rubber, plastic fiber, etc. and each dial is provided with ten indentations described above along its outer periphery. The selector dials are separated by spacers 171 through 177, inclusive, which are attached to the case 130. As indicated in Fig. 5, each dial is attached to an individual support 166 so that each dial may be moved approximately one-quarter of a revolution about shaft 129. The inner surface of each of these dials is provided with ten grooves which correspond to the finger indentations on the outer periphery of the dial. The grooves on the inner surface of each dial cooperate with a detent pawl 336 to secure each dial in one of the ten positions as selected by the operator. As indicated in Fig. 3 and Fig. 5 the detent pawl 336 which cooperates with dial 316 is pivoted about shaft 136. Spring 346 is attached between support 166 and pawl 336 so that pawl 336 is normally forced against dial 316 thereby securing the dial in a fixed position by engaging with one of the ten grooves. Spring 346 also serves to apply a continuous force to support 166 which tends to rotate the support 166 and dial 316 in a clockwise direction about shaft 129. The grooves on the dial and the detent pawls are shaped and positioned so that by pressing upon the indentations in the dial an operator can move the dial in either direction while at the same time the ratchet action of the pawl against the grooves secures the dial in any one of the ten positions to which it may be moved. The rotary movement of the dials is limited to about one-quarter of a revolution by stop 131 and insulator 191.

A release arm 138 is interconnected with a release lever 133 and is provided with slots to engage each of the detent pawls. When lever 133 is in its normal position, arm 138 permits each detent pawl to engage the groove in the corresponding dial. When lever 133 is depressed arm 138 is moved in a clockwise direction about shaft 136 and the detent pawls are disengaged from the dials thereby permitting the springs associated with each dial such as spring 346 to cause each dial to return to its initial position.

In order to select two out of five frequencies for each of the numerals to be represented by the signals, each of the finger wheels is provided with two contact members. These contact members are illustrated in Figs. 5 and 6 by springs 326 and 326' and are connected by means of flexible leads or wires 356 and 356' to corresponding terminals or screws 146 and 146'. Each of the springs 326 is arranged to make contact with one of the bus bars 61 through 70, inclusive, and spring 326' is arranged to make contact with one of the bus bars 61' through 70', inclusive. Thus, in any of the positions of the associated finger wheel or dials such as dial 316 shown in Fig. 5, the spring or brush contact member 326 will make contact with one of the bus bars 61 through 70 and the brush or contact member 326' will make contact with one of the corresponding bus bars 61' through 70'. The insulating member 191 extends along the rear of the mechanism and supports two sets of bus bars 61 through 70 and 61' through 70' as indicated in the drawings. In this way contacts are made between a proper tone or frequency generator and the distributor mechanism shown in Figs. 7, 8, 9 and 10.

The distributor mechanism indicated generally at 114 in Fig. 2 is shown in greater detail in Figs. 7, 8 and 9 and its mode of operation is represented in Fig. 10. As described above, motor 119 rotates shaft 150 which is coupled by means of gears 118 and 117 to shaft 151. Fig. 8 and Fig. 9 show that shaft 151 has mounted upon it a transverse member 126, each end of which supports the respective permanent magnets 112 and 113. As the magnets 112 and 113 are rotated by shaft 151 they are moved past two groups of enclosed reed-type relay switches such as disclosed in the Patents 2,289,830, granted to W. B. Ellwood, May 2, 1950, for example. As each magnet approaches one of these reed contact switches A1 through A8, inclusive and B1 through B8, inclusive, its contacts are closed due to the magnetic fields set up by the magnets 112 and 113. As indicated in Fig. 10, switch A1 closes and opens at the same time sfitch B1 closes and opens. A short interval of time after A1 and B1 closes and opens switches A2 and B2 close and open. Thus, a pair of switches, that is, one switch of the A group and one switch of the B group are closed at a time and the switches in each group are closed in succession, thus connecting the contacts of the finger wheels in succession to the subscriber's line extending to the central station. As shown in Fig. 10 each set of contacts opens before the contacts of the next set close.

The telephone transmission equipment, namely, the telephone transmitter and receiver and the related transmission circuits and equipment have not been shown in Fig. 1 or in Figs. 2 through 9 because this equipment operates in its normal fashion. In addition, the switching equipment for connecting and disconnecting the signaling equipment shown in Figs. 1 and 2 through 9 as well as the telephone transmission equipment is not shown herein because it operates in the usual manner. Suitable types of switching equipment for controlling the signal transmission and communication apparatus at the subscriber's station are shown and described in greater detail in a patent applictaion of Malthaner, Serial No. 35,925, filed June 29, 1948, which issued on December 2, 1952, as United States Patent No. 2,620,399; an application of Dunlap-Malthaner, Serial No. 116,068, filed September 16, 1949, which issued on March 16, 1954, as United States Patent No. 2,672,523; and an application of Hill-Parkinson, Serial No. 115,016, filed September 10, 1949, which issued on June 3, 1952, as United States Patent No.

2,598,695. While the foregoing switching equipment and telephone transmitter and receiver have not been shown, it is understood that this equipment is provided and cooperates with the equipment shown herein in such a way that neither the signaling equipment nor the telephone transmission equipment interfere with each other and are not adversely affected by the presence of the other.

In operating the calling device in accordance with this invention, the subscriber will first position the dials of the finger wheels 311 through 318 in accordance with the digits, characters or symbols of the called subscriber's station designation or number. The actuation of these selecting devices will cause the spring or brush contacts 321 through 328 and 321' through 328' (of which 326 and 326' only are shown in the drawing) to selectively make contact with bus bars 61 through 70 and 61' through 70' and thus be connected to the various tone or alternating-current generators 201 through 205, inclusive. Thereafter the subscriber will initiate the call which in turn actuates switching equipment at the central station which connects both the source of alternating current and also the receiving equipment shown in the remaining figures of the drawing 11 through 23, inclusive, to the subscriber's line. Alternating current is transmitted to the subscriber's station where it actuates motor 119. Motor 119, in operating causes the tone wheels 200 through 205, inclusive, to be rotated with the result that the respective frequencies $9f$ and $12f$ through $16f$ are all generated. In addition, the rotation of motor 119 also actuates the distributor 114 which in turn successively closes pairs of contacts in the manner described above with the result that for a short interval of time a selected pair of frequencies are simultaneously applied to the subscriber's line extending to the switching station followed by a slight pause, whereupon two other frequencies (or the same frequencies) will be applied to the subscriber's line in accordance with the next numeral set up at the subscriber's station. In this manner signaling currents are employed to represent each of the symbols of a called subscriber's station. Each symbol or numeral is represented by two out of five of the five available signaling frequencies. At the same time, the sixth or synchronizing frequency $9f$ is continuously transmitted to the central station. After signaling currents representing the last of the various symbols or digits of the called station designation have been transmitted to the central exchange, no signals are transmitted for an interval of time which interval of time, in the exemplary embodiment set forth herein is approximately equivalent to the time required to send signals representing two different numerals. At the end of this pause the above cycle of operations is repeated over and over again beginning with the first symbol or digit of the called station designation so long as alternating current is applied to the subscriber's line at the central station and the subscriber's equipment works in its normal manner as described above.

*Receiving equipment at the central office*

As described above, the subscriber's line 10 is connected at the central office through suitable switching equipment (not shown) to the various circuits and equipment shown in Fig. 1. The source of alternating current energizing the motor at the subscriber's station is shown in Fig. 2 and rectangle 12 in Fig. 1. As shown in Figs. 1 and 2, the conductors 9 extending to the subscriber's station over the subscriber's line 10 also extend to amplifiers 13 and 14. Considering the output of amplifier 14 first, the amplified signals received from the subscriber's station pass through the band-pass filter 16 which is designed to permit only frequency $9f$ to pass. This filter should be a reasonably sharp filter to give a high degree of discrimination against noise power frequency and the other signaling frequencies. This filter 16 is intended to represent such filtering elements as may be required. Some of the elements may be connected between conductors 9 and amplifier 14; some of the filter elements may be incorporated in the amplifier and some of the elements may be after the amplifier. The output 19 of band-pass filter 16 extends to the frequency converting circuit shown in Fig. 12. The input to this circuit is represented by conductor 19 which conductors represent the same conductors designated 19 in Fig. 1.

It is noted that in Fig. 1 a single line is shown whereas two conductors are shown in Fig. 12 all designated 19. It is to be understood that many of the single line conductors of Fig. 1 represent a plurality of conductors. Furthermore, while it may be desirable to have balanced circuits for interconnecting the various components of the exemplary system set forth herein, it is not necessary to so interconnect the circuits. If proper precautions are taken they may be interconnected by means of unbalanced circuits. Fig. 12 shows the manner in which the various frequencies $12f$ through $16f$ are derived from the input frequency $9f$ received from the subscriber's station.

The arrangement disclosed in Fig. 12 is believed to be substantially self-explanatory. The arrangement employs regenerative frequency dividing networks, frequency doublers, modulators and frequency selective networks. Frequency changing circuits employing elements of the type indicated in Fig. 12 are described in greater detail in a paper entitled "A secondary frequency standard" by F. R. Stansel in the Proceedings of the Institute of Radio Engineers for April 1942, pages 157 through 162, inclusive.

Ample time is provided for allowing the starting of the various circuits since the initial one of the repetitive transmissions of the number from the subscriber's station will only rarely start with pulses representing the first symbol or numeral of a subscriber's station designation. Ample time is thus provided, before the circuits are set into operation by the pause between complete numbers, as hereinafter explained to permit the frequency dividing circuits to become fully operative to supply the frequencies $12f$ through $16f$, inclusive.

Of course, other types of frequency changers may be employed and they may be connected in different combinations to obtain the desired frequencies from the frequency $9f$ or some other frequency supplied over conductor 19 from the band-pass filter 16. Briefly, in the exemplary embodiment of this invention described herein the incoming frequency $9f$ is applied to one input of modulator 1201 part of the output of which passes through band-pass filter 1202 adjusted to pass frequency $3f$ and through a frequency doubler 1203 and a band-pass filter 1204 adjusted to pass frequency $6f$. The output of the band-pass filter 1204 is fed back to the other input of modulator 1201 for beating with the incoming frequency $9f$. The resultant side-bands comprise frequencies of $3f$ and $15f$. The application of frequency $9f$ to this modulator causes a small amount of current of frequency $3f$ to flow in its output circuit which then is fed back in the manner described above so that the system builds up and operates with considerable stability and supplies frequencies of $15f$ and $3f$ in the output circuit of the modulator 1201. This output is also supplied to band-pass filter 1207 which selects frequency $15f$, one of those desired for subsequent use in the control and multiplying circuits. The output of the band-pass filter 1204 is also applied to a frequency doubler circuit 1205 and then band-pass filter 1206 for supplying a frequency $12f$ which is also used in the multiplying circuits as described hereinafter. In a somewhat similar manner the other four frequencies $13f$ through $16f$ are derived as indicated in Fig. 12.

As described herein the frequency $9f$ is continuously supplied to the subscriber's line at the subscriber's station throughout the signaling interval. Consequently, this frequency is also continuously supplied to the frequency converter circuit 17 of Fig. 1, shown in detail in Fig. 12, with the result that the output frequencies $12f$ through $16f$ from the frequency converter circuit are continuously available at all times during the signaling from the subscriber's station. Thus, these frequencies are available for controlling the multiplying circuits as described herein.

*Amplifier, clipper and pulse generating circuit*

The frequency 15*f* output from Fig. 12 is interconnected with the input lead of Fig. 21. The output of the frequency 15*f* is also connected to one of the multiplying circuits as shown in the drawings and described herein.

The first tube 2110 is arranged to amplify the output from the frequency converter circuit. The wave form 2111 illustrates a typical input wave form as received over the input lead from the frequency converting circuit. This wave form is amplified by tube 2110 and appears in the output circuit of this tube as shown by the graph 2112. This output wave form is then applied via direct coupling means to a second amplifying tube 2113 which tube further amplifies the signal but becomes overloaded so that this tube acts as a clipper and clips off the top and bottom of the wave form. The output wave form is illustrated at 2114. The next tube 2115 operates in the manner similar to the manner of operation of tube 2113 and produces a more nearly square wave output as illustrated at 2116. Condenser 2117 and resistor 2118 are employed to differentiate the wave form 2116 output from tube 2115 which differentiated wave form is illustrated at 2119. A diode or crystal rectifier 2120 together with resistor 2121 are provided to suppress the positive pulses in wave form 2119 so that only the negative portions of the wave form 2119 as shown by wave form 2122 are applied through a coupling condenser 2123 to the grid or control element of the left-hand section of tube 2124.

The sections of tube 2124 are connected in a single-cycle multivibrator circuit in which the left-hand section is normally conducting. However, upon the application of a negative pulse to its control element or grid the output current through this section tends to decrease and in turn apply a positive voltage to the control element of the right-hand section with the result that current starts to flow through this section and applies a more negative voltage to the control element of the left-hand section of tube 2124. The above action continues causing the current flowing through the left-hand section to be abruptly interrupted and the flow of current through the right-hand section to be initiated. A short interval of time later, determined by the constants of tube 2124, condenser 2125 and resistors 2126 and 2127 the voltage of the control element or grid of the left-hand section of tube 2124 becomes sufficiently positive or less negative to cause current to again start to flow in the left-hand section of tube 2124. As a result, current through this section rises abruptly and interrupts the current flowing through the right-hand section of tube 2124. The output is obtained from the anode of the left-hand section of tube 2124 which has a wave form shown at 2128 and the manner in which this form is related to the applied frequency 15*f* is shown in the wave form 2129 drawn to the same time-scale right above the wave form 2128. As illustrated, a positive pulse of short duration is obtained for each cycle of the applied frequency 15*f* and the pulse is obtained when the applied frequency is about to pass through zero in a positive-going direction.

As is well understood the duration of each of the pulses is controlled by the time constants of the circuit of condenser 2125 including resistors 2126 and 2127.

*Start circuit*

The start circuit is indicated by a rectangle 20 of Fig. 1 and is shown in greater detail in Fig. 11. The start circuit is supplied from lead 18 of Fig. 1 from the output of the band elimination filter 15. The filter 15, like filter 16, is intended to represent the filter elements between conductors 9 and 18 required to eliminate the power frequency from source 12 and also frequency 9*f*. This filter is intended to represent filter elements which may be between conductors 9 and amplifier 13, filter elements incorporated in amplifier 13, as well as the filter elements following amplifier 13.

Thus, lead 18 has all the signaling currents on it except the steady synchronizing current having a frequency of 9*f*. Consequently, both of the selected two signaling pulse frequencies are applied to conductor 18 for each digit. Conductor 18 is coupled to the control grid of gas discharge tube 1110 of Fig. 11. Tube 1110 is a gaseous conduction tube having two control elements or grids which control the initiation of a discharge current between the anode and cathode of the tube, but once a discharge has been initiated, these elements lose control of the discharge and are ineffective to suppress or interrupt a discharge.

Normally, before any signaling pulses are received from a calling station and applied to a grid or control element of tube 1110, condenser 1124 will be discharged so that the upper or second control element or tube 1110 will be at substantially zero or ground potential. In addition, condenser 1131, connected in the anode circuit of this tube will be charged to a relatively high voltage. The positive 300 volts battery, supplied through the high value resistor 1111, will establish a potential across condenser 1131 which will be limited by the flow of grid cathode current in the left-hand section of tube 1112, which is connected thereto. Under this condition the anode-cathode path of the left-hand section of this tube will also be conducting.

Tube 1112 is a differential amplifier or gating tube having its left-hand grid, as shown in Fig. 11, connected to the upper terminal of condenser 1131 while its right-hand grid is connected to a voltage divider comprising resistors 1113, 1114 and 1115 and is employed to compare the voltage on condenser 1131 with the voltage of the voltage divider connected to the right-hand grid. So long as the condenser voltage is less than the reference voltage on the grid of the right-hand section, the right-hand section of tube 1112 is conducting and the left-hand section is non-conducting. When the voltage on condenser 1131 becomes approximately equal to or greater than the reference voltage, the conduction shifts abruptly from the right-hand section of the tube to the left-hand section. The abruptness of the shift is increased by the small cross-coupling condensers.

Consequently, before any signals are received, the voltage of the condenser 1131 is of a high positive value as described above so that the left-hand section of tube 1112 is conducting while the right-hand section is non-conducting.

Tube 1116 is arranged as a single cycle multivibrator circuit of which the right-hand section is normally conducting. The timing circuit associated with this tube has a relatively short time constant, as will be described hereinafter. In addition, the left-hand grid or control element of tube 1116 is coupled to and will be driven by the anode of the right-hand section of tube 1112.

Tube 1117 is similarly connected in a single multivibrator circuit with the right-hand side normally conducting. The time constant of this circuit is such that when the conduction within the tube shifts, the shifted status is maintained for an interval of time which is only somewhat less than the time assigned for the generation and transmission of a complete called station designation.

When the first signal wave pulse is received and applied to the lower or inner control element or grid of tube 1110 as shown in Fig. 11 a discharge will be initiated through this tube on the first positive half cycle of the alternating-current pulses. If the first received half cycle of the applied signaling currents happens to be negative then the tube does not have a discharge initiated through it until the second half cycle which will thereupon be positive. If the first half cycle of the applied signaling currents is positive then the discharge will be initiated through this tube in the first half cycle of the applied pulses.

The applied signaling wave pulses are also transmitted through transformer 1121 and applied to the diode or rectifier 1122. The phase of the pulses applied to the diode 1122 is opposite to the phase of the pulses applied to the lower control grid of tube 1110. The diode 1122 is poled so that it passes current only when the upper terminal of the secondary winding of transformer 1122 is negative. In other words, the applied signaling wave over conductor 18 must be positive for the diode 1122 to conduct current. If the first half cycle of the applied signaling pulse is negative then neither tube 1110 nor the diode 1122 passes any current. When the applied pulse becomes positive then a discharge is initiated through tube 1110 and the current also flows through the diode 1122. As a result, condenser 1124 starts to charge negatively through the voltage dividing resistor network comprising resistors 1123 and 1125. The graph designated 1125 shows an exemplary incoming signal wave of simplified shape from conductor 18 while graph 1126 shows the built-up of voltage across condenser 1124 for each of the succeeding half cycles of the alternating-current signaling pulses. It is to be noted that the charge on condenser 1124 will build up to some voltage in the order of 5 to 15 volts. It is assumed that this voltage is 10 volts in Fig. 11. The voltage of the upper terminal of condenser 1124 becomes negative with respect to ground, which voltage is applied to the suppressor or second control grid of tube 1110.

Tube 1110, in having a discharge initiated through it, quickly discharges condenser 1131 through resistor 1118 so that the voltage of its upper terminal falls to relatively low value, insufficient to further sustain the discharge in the tube. Resistor 1111 is of such high value that current flowing through it, from the positive battery is also insufficient to sustain the discharge. As a result, after a short interval of time, determined by the constants of tube 1110, condenser 1131 and resistor 1118, the discharge initiated in tube 1110 by the input signal on its grid is interrupted in the manner understood in the prior art. Once the discharge has taken place and has been self-interrupted in this manner, some considerable time must elapse before condenser 1131, recharging through high valued resistor 1111, has built up enough terminal voltage to make possible another initiation of discharge. During this period of enforced quiescence or starvation of tube 1110, the sine waves comprising the pulse whose beginning initiated the discharge, continue to arrive and cause the further build up of the voltage on the upper terminal of condenser 1124. Signaling pulse voltage is, of course, still applied to the control grid of tube 1110, but by the time that condenser 1131 has built up enough voltage to make possible the initiation of a second discharge during the pulse wave train, the suppressor, screen, or second element of this tube is sufficiently negative to preclude another discharge through the tube. Consequently, the tube remains non-conducting during the remainder of the wave train comprising the pulse. It should be noted that the negative charge is maintained upon the upper terminal of condenser 1124 by the action of the diode 1122 so long as the signaling pulse is received over conductor 18, but at the end of the signaling pulse received over conductor 18 no further charging current will be supplied to maintain the condenser 1124 charged to a negative value so that it will discharge through the resistor 1125 and thereafter condition tube 1110 to respond to the beginning of the next wave train representing the next succeeding digit.

Returning now to condenser 1131 as described above, when a discharge is initiated through tube 1110 the voltage on the upper terminal of this condenser falls to a very low value with the result that conduction through the left-hand section of tube 1112 is interrupted and transferred to the right-hand section of this tube. As a result, a negative going pulse is applied to the control grid of the left-hand section of tube 1116. However, since this section of tube 1116 is now non-conducting, the circuits and equipment do not further respond to this negative going voltage.

The constants of condenser 1131, resistor 1111 and resistor 1118 are such that the voltage on the upper terminal of the condenser 1131, while rising to a sufficiently high voltage to permit the initiation of another discharge at the beginning of the next signal wave train does not, during any single signal pulse interval rise to a value near that of the bias voltage applied to the grid of the right-hand section of tube 1112. Hence the discharge within tube 1112 does not shift back during the period of the wave train which initiated the first discharge in tube 1110. At the beginning of the next pulse interval the voltage on the suppressor or second control element of tube 1110 will have fallen to substantially ground or zero voltage with the result that another discharge is initiated through tube 1110 again discharging the partially charged condenser 1131 and reducing the voltage at the upper terminal of this condenser. Thus, during all the time pulses are received representing successive digits of a subscriber's number, the upper terminal of condenser 1131 though it rises and falls in voltage, never reaches a high enough voltage, that is to say never becomes sufficiently charged, to cause the conduction within the tube 1112 to be interchanged and restored to the original condition.

The above-described operation of the start circuit is illustrated graphically in Fig. 24 wherein the first horizontal line shows stylized representations of the beginnings of signaling pulses. As indicated, it is assumed that receiving equipment becomes connected to the line in the middle of the transmission of a complete subscriber's designation so that a fragment comprising the last pulses of the subscriber's designation is the first information to be received. Of course, any number of such signaling pulses, including the complete number, may comprise the first information to be received; the receiving device will, in any case, respond in a manner similar to that described hereinafter.

The second graph or broken line 2431 of Fig. 24 represents the voltage on the upper terminal of condenser 1131. The third line in Fig. 24 shows the voltage of the right-hand anode of tube 112. The next line shows the voltage of the anode of the left-hand section of tube 1116 while the final line 2417 shows the voltage of the right-hand anode of tube 1117.

As illustrated in Fig. 24 and described herein, the condenser 1131 is at a relatively high positive voltage when no signals are being received and is reduced to a low voltage when discharge is initiated upon the reception of the first signaling pulses as pointed out above. At this time the discharges through tubes 1116 and 1117 are not changed or disturbed. So long as signal wave train pulses continue to be received in regular rhythm as successive digits are transmitted, the upper terminal of condenser 1131 does not have time to be changed to a sufficiently high positive voltage to cause the discharge currents through tube 1112 to be shifted back to the original condition. After transmission of the signal pulse representing the last digit or symbol of the complete subscriber's station designation a blank interval occurs during which no signals are transmitted to the receiver. This blank interval has a duration equal to that of two digit signal pulses in the illustrative example being explained here. It may, however, in different embodiments, have any length significantly greater than that of one digit pulse length.

When the blank interval between the end of one transmission of the numbers of the subscribers' designations and the beginning of the next is received, condenser 1131 has time to charge sufficiently so that the upper terminal reaches a high positive voltage which exceeds the voltage of the grid of the right-hand section of tube 1112. This occurs at some time during the blank interval such as shown at time *t1* in Fig. 24. As a result, the conduction through the right-hand section of tube 1112 is interrupted and the flow of current through the left-hand section is initiated at this time. As a result of the interruption of current through the right-hand section, the voltage of the anode of the right-hand section rises and applies a positive going pulse to the left-hand grid of tube 1116 which thereupon starts to conduct current in its left-hand section and has its right-hand section cut off. The time constant of the circuits associated with tube 1116 is such that it restores to its initial condition automatically before the beginning of the first pulse of the next series of pulses representing a complete subscriber's number. At the restoration of normal conditions in tube 1116 the interruption of current through the left-hand section of tube 1116 applies a positive pulse to the left-hand grid of tube 1117 and thus initiates current flow through this section and interrupts the flow of current through the right-hand section of the tube 1117. The above-described operation is shown at time *t2* in Fig. 24. Thereafter, when the first signaling pulse of the new train of pulses is received, condenser 1131 is discharged and the previously-described cycle operation is repeated. Tube 1117 nevertheless remains with its left-hand section conducting and its right-hand section non-conducting throughout the time pulses representing a complete subscriber's designation are received and is automatically restored to its initial condition just after the beginning of the next succeeding pause or blank interval following the pulses representing a complete subscriber's designation. The above-described operation is illustrated by graph 2417 of Fig. 24 where the tube 1117 is shown to be restored to its normal condition at time *t3*.

One output from the start circuit as shown in Fig. 11 is obtained from the upper terminal of condenser 1131; another output, designated "Number Start" which extends to the steering circuit, Fig. 15, is obtained from the right-hand anode of tube 1117 and a third output from the anode of the left-hand section of tube 1117 extends to the number checking circuits of Figs. 17 and 18, described hereinafter.

The connection from the upper terminal of condenser 1131 extends to the grid of the left-hand section of tube 2310 in the single cycle "delay" multivibrator shown in Fig. 23 and represented in rectangle 42 of Fig. 1. The output of this single cycle multivibrator is connected to the input of the second single cycle multivibrator comprising tube 2311 and related circuits. This second multivibrator is represented in rectangle 41 of Fig. 1 and is employed to clamp or control the counter circuit represented by rectangle 40 in Fig. 1 as shown in greater detail in Fig. 22.

Tube 2310 is connected in a single cycle multivibrator circuit in which its left-hand section is normally conducting current and the right-hand section is normally cut off. Likewise, tube 2311 is connected in a single cycle multivibrator circuit in which the left-hand section is normally conducting current and the right-hand section is cut off.

During normal operation of the system, each time the condenser 1131 is discharged a negative pulse is applied to the left-hand grid of tube 2310 which causes current flowing through the left-hand section of this tube to be interrupted and current flowing through the right-hand section to be initiated. As a result, the anode of the left-hand section becomes more positive and applies a positive pulse to the control grid of the left-hand section of tube 2311. Since tube 2311 is already conducting current in this section, this pulse produces little or no effect on it. Near the end of the characteristic pulse-time of this multivibrator a positive pulse is received from the pulse generator and is applied to the anode of the right-hand section of tube 2311, then through the cross coupling condenser and to the control grid of the left-hand section of this tube. Arrival of the leading edge of this pulse restores the discharge to the left-hand section and interrupts the discharge to the right-hand section. Thus the actual instant of restoration is determined by the arrival of the pulse from the circuit of Fig. 21 rather than by the time constant of the multivibrator circuit itself. As a result of this restoration, the anode of the left-hand section becomes more negative and applies a negative pulse to the input circuit of the clamping multivibrator 2311 which causes current flowing through the left-hand section of this tube to be interrupted and the flow of current through the right-hand section to be initiated. As a result, the anode of the left-hand section of tube 2311 rises to a high positive value which high voltage is applied to the control or "clamp" lead 2243 extending to the binary counter shown in Fig. 22.

Upon the application of a positive voltage to this lead the binary counter is "unclamped" and rendered capable of operation. It will thereupon count pulses from the pulse generator represented by rectangle 39 in Fig. 1 and shown in detail in Fig. 22, operating on the trailing edges of said pulses.

*Binary counter*

As shown in Fig. 1, a four-stage binary counter 40 is provided and supplied by impulses from the pulse generator 39 and also controlled by the counter clamp single-cycle multivibrator 41. The counter is shown in greater detail in Fig. 22. As shown in Fig. 22, four stages are provided—2211, 2212, 2213 and 2214. The pulses from pulse generator 39 are supplied over conductor 2130 from Fig. 21. The wave form of the pulses supplied over lead 2130 is shown by the graph 2128 in Fig. 22 and is also illustrated in Figs. 21 and 25. These pulses are differentiated and the positive pulse resulting from the leading edge substantially eliminated by the network comprising the diode or crystal rectifier 2216 and resistors 2240 and 2241 and condenser 2242. The action of the network produces wave forms shown by the graph 2215 and 2217 at the points in the circuits shown in Fig. 22. The wave form 2217 is then coupled to the first binary stage as shown in the drawing.

As described above, the synchronizing frequency *9f* is continuously supplied by the subscriber's station during the signaling interval so that this frequency is continuously supplied to the frequency converter 17 of Fig. 1. As a result, the output frequency *15f* is continuously supplied to the pulse generator 39 during this interval of time. Consequently pulses having a wave form shown in graph 2217 are continuously supplied to the first binary stage of Fig. 22.

However, conductor 2243 extends to the counter clamp circuit represented by rectangle 41 in Fig. 1 and shown in greater detail in Fig. 23. Lead 2243 extends to the anode of the left-hand section of tube 2311, which section is normally conducting. Consequently the voltage of this lead is normally maintained at a value relatively considerably lower than that of the anode supply voltage of the binary counter stages. As a result, the anode of the left-hand section of each of the binary counting tubes such as tube 2244 is also maintained at a relatively low voltage with the result that the control element or grid of the right-hand section of this tube is also maintained at a relatively low voltage so that the right-hand section of this tube is normally cut off; the left-hand section will therefore maintain conduction. The circuit path for maintaining these voltage conditions extends from the anode of the left-hand section of tube 2311 over conductor 2243 and through the respective diodes 2221, 2222, 2223, and 2224 to the left-hand anodes of the tubes of the counter stages 2211, 2212, 2213, and 2214. With lead 2243 maintained at a relative low voltage the diodes 2221 through 2224, inclusive, are conducting with the result that the left-hand anodes of counter tubes are maintained at substantially this same voltage.

As a result the counter circuit does not count the pulses from the pulse generator 39 shown in detail in Fig. 21. However, as described above, after signaling pulses are received, the conduction within the sections of tube 2311 is interchanged so that the current flowing through the left-hand section is interrupted and the flow of current initiated through the right-hand section of tube 2311. As a result, the anode of the left-hand section rises in voltage to substantially the same value as the anode supply voltage of the binary counter stages so that the coupling diodes or crystal rectifiers 2221, 2222, 2223, and 2224 cease to conduct current. Consequently, the binary counter shown in Fig. 22 starts to count the incoming pulses from Fig. 21 in the usual manner. It should be noted that the binary counter is actuated on the trailing edge of each of the input pulses since it is actuated by the negative pulses 2217 which are generated at the trailing edge at each of the input pulses over the lead 2130.

The time relationships obtaining between the above-described operation of the pulse generator shown in Fig. 21; the operation of the start circuit shown in Fig. 11; the operation of the various single-cycle multivibrators shown in Fig. 23; and the operation of the various stages of the binary counter circuits are illustrated in greater detail by the various graphs shown in Fig. 25.

Here graph 2128 represents the pulses generated by the pulse generator of Fig. 21 which pulses are applied as a return synchronizing signal to the single-cycle multivibrator tube 2310, and also, as pulses to be counted, to the binary counter circuits shown in Fig. 22. Graph 2510 represents the digit start pulses from the start circuit applied to the control grid of the left-hand section of the single-cycle delay multivibrator 2310. These are the same events which are represented in graph 2431 of Fig. 24 by the vertical parts of the saw-tooth wave shape. Fig. 25 shows them to be a much enlarged time scale in order to clearly illustrate the various actions which take place between successive pulses. As described above, application of the negative pulse from the start circuit occasioned by the beginning of each of the signaling pulses, interrupts the current flowing through the left-hand section of tube 2310 with the result that the voltage of its anode rises as shown by graph 2511. The pulses from the pulse generator, Fig. 21, are also applied to the control grid of the left-hand section of tube 2310 through the coupling condenser to the anode of the right-hand section of this tube. Consequently, near the end of the time interval for which the circuits of this tube are adjusted, one of the pulses from the pulse generator of Fig. 21 initiates the flow of current through the left-hand section of tube 2310 and causes its anode voltage to fall. This is illustrated by pulse 2535. It is to be noted that the discharge through the right-hand section can only be initiated by a positive going pulse. This means that the leading edge of pulse 2535 as shown in Fig. 25 causes the discharges within tube 2310 to interchange. The fall in potential of the anode of the left-hand section of tube 2310 applies a negative pulse to the grid of the left-hand section of tube 2311 which interrupts the discharge through this tube with the result that its anode raises to a high positive voltage and unclamps the binary counter because the coupling diodes 2221 through 2241 inclusive cease to conduct. As a result, the binary counter starts to count on the trailing edge of pulse 2535 and as shown by graph 2513, which shows the anode potential of the left-hand section of stage 2211, the discharge through this section of the first stage is interrupted by this trailing edge. Graph 2514 shows the voltage of the corresponding anode of the second stage of the binary counter. Graph 2515 shows the corresponding voltage from the third stage of the binary counter and graph 2516 shows the voltage from the corresponding anode of the fourth stage of the binary counter. The binary counter continues thereafter to count pulses so long as the multivibrator clamp tube 2311 has the discharge through its left-hand section interrupted. Upon the reinitiation of discharge through this section, the operation of the counter will be interrupted as described hereinafter.

Upon the counting of the first pulse by the first stage of the binary counter, due to the rise in voltage of the anode of the left-hand section of tube 2244, a positive pulse is applied to the control grid of tube 2231 through the varistor gate circuit 2233. This gate circuit comprises four varistors, one connected to each left-hand anode of the respective stages of the binary counter. These varistors are poled in such a direction that a positive voltage is applied to the grid of tube 2231 when any one of the left-hand anodes of the counter stages is at its positive excursion. In other words, these varistors are connected as a so-called "or" circuit. Consequently, positive voltage continues to be applied to the control grid of tube 2231 except for the 16th interval of the four-stage binary count. The graph 2517 represents the voltage at the control grid of tube 2231. As shown by graph 2517, a plurality of very short pulses 2530 would be expected to appear during transitions between conductions of the various stages of the binary counter. In order to prevent these pulses from adversely affecting the operation of the system, a condenser 2234 is shunted across the resistor normally forming part of the "or" circuit. This condenser effectively suppresses these short pulses so that they do not appear at the grid or in the output of tube 2231, as shown by graph 2246 of Fig. 22.

Condenser 2246 together with resistor 2247 are employed to differentiate the output of tube 2231. Consequently, upon the trailing edge of the first of the pulses counted by the binary counter the grid of tube 2231 becomes positive so that the anode of this tube becomes more negative as shown by graph 2256. Consequently, a sharp negative pulse is generated at this time which pulse is transmitted through the diode 2245 and over conductor 2237 to the anode of the right-hand section of tube 2320 and then through the coupling condenser to the grid of the left-hand section of this tube.

The graph 2518 shown in Figs. 22 and 25 illustrates the wave form of the voltage on conductor 2237.

Tube 2320 has both sections connected in a single cycle multivibrator circuit in which the left-hand section is normally conducting. Consequently, upon the application of a negative pulse from conductor 2237 the discharge through the left-hand section of tube 2320 is interrupted and a discharge is initiated through the right-hand section of this tube. The discharge then continues through the right-hand section of this tube for an interval of time arranged to be somewhat in excess of the time required for a count of sixteen by the binary counter shown in Fig. 22, which time interval is represented in Fig. 25 to be approximately 12 milliseconds on the assumption, in our exemplary embodiment, that $f$ is 100 cycles per second. It terminates at time 2534, as shown on the graph.

The grids of the respective sections of tube 2320 are also direct coupled or connected to the grids of the respective sections of tube 2321 which tube is employed as a driving tube to provide sufficient power output to properly control the voltages applied to leads 2610 and 2017 extending to the integration circuits to control the integration in these circuits as described hereinafter. Thus, when tube 2320 is normal, that is, the left-hand section conducting and the right-hand section non-conducting, the left-hand section of tube 2320 is also conducting while the right-hand sections of both of these tubes, 2320 and 2321, are non-conducting. Consequently, the anode of the left-hand section of tube 2321 is normally maintained at a relatively low voltage such as positive 100 volts. The anode of the right-hand section of tube 2321 is maintained at a relatively high positive voltage which is substantially equal to the anode battery voltage of 300 volts. When the discharge through the left-hand section of tube 2320 is interrupting and the discharge through the right-hand section initiated as described above, the voltage conditions applied to leads 2016 and 2018 are interchanged with lead 2016 having approximately +300 volts applied to it and lead 2017 having approximately +100 volts applied to it.

Upon the counting of sixteen pulses by the binary counter, that is, after the count of the sixteenth pulse, all of the binary counter stages are returned to their normal or initial condition. As a result, the voltage on the grid of tube 2231 falls to a more negative value with the result that the anode of this tube becomes more positive. The diode 2245 is employed to attenuate the transmission of this positive pulse generated by the differentiating condenser 2246 and resistor 2247. This pulse is illustrated at 2531 in graph 2518 and, as shown, the magnitude of this pulse is much less than the magnitude of the negative pulse applied to conductor 2237.

Upon the counting of the next or seventeenth pulse from the pulse generator, a positive voltage is again applied to the control grid of tube 2231 which causes another negative pulse to be applied to conductor 2237 in the same manner as described above, which pulse is illustrated at 2532 in graph 2518. At this time, the left-hand section of tube 2320 is still non-conducting or cut off so that this pulse produces no effect upon the circuits. Later, when tube 2311 restores to normal, that is, conduction again starts through the left-hand section of this tube, the binary counter stages are returned to normal because of the low voltage applied to lead 2243. This low voltage causes the coupling diodes 2221, 2222, 2223 and 2224 to become conducting and maintain the anodes of the left-hand sections of all of the counting stages at the relative low voltage. Consequently, this low voltage is also applied to the grid of tube 2231 with the result that the second positive pulse 2533 is also impressed upon conductor 2237. This pulse may or may not restore the conductions within tube 2320 to the initial condition at this time. At a short interval of time later, due to its own timing circuits, tube 2320 will be restored to normal if it was not previously restored as described above, and restore the voltages applied to conductors 2016 and 2017 to their initial condition.

In addition to the varistor network 2233 connected to the output of the output or anodes of the left-hand sections of each of the binary counter stages, a second varistor network 2232 also has connections extending to these anodes. In addition, this network includes an additional varistor connected to the input pulses from the pulse generating circuit supplied on lead 2130. The varistors in network 2232 are poled oppositely to the varistors in network 2233 so that the network 2232 operates as an "and" circuit. In other words, the potential of the output of this network, applied to the grid of tube 2230 through the coupling resistors, will hold the grid negative so long as any one of the output or left-hand anodes of the various binary counter stages remains at its negative excursion. In other words, the anodes of all of the left-hand sections of the binary stages must have their most positive value, and the potential from the pulse generating circuit must also have its most positive value before the grid of tube 2230 becomes sufficiently less negative to cause any appreciable current to flow in the output circuit of tube 2230. As a result, the grid of tube 2230 is held negative at all times except during the brief time interval during which the sixteenth pulse is received from the pulse generating circuit of Fig. 21. A corresponding negative pulse is repeated in the output circuit of this tube which is shown by graph 2520 in both Figs. 22 and 25. This negative pulse is applied to the anode of the right-hand section and through the coupling network to the control grid of the left-hand section of multivibrator tube 2236.

Tube 2236 has its sections connected in a single cycle multivibrator circuit having a time constant substantially twice the length of the individual pulses generated by the pulse generating circuit 21. The left-hand section of this tube is normally conducting. Consequently, upon the application of the negative pulse to its control grid as described above, the conduction through this section is interrupted and the discharge initiated through the right-hand section with the result that the anode of the left-hand section becomes more positive and remains so for a time interval equal to substantially twice the pulse length of the pulses received from the start circuit. This positive pulse is repeated by the cathode follower tube 2239 which operates as an output driver stage for energizing the detector circuits shown in Fig. 14 and the steering circuit shown in Fig. 15. This output pulse is illustrated by graph 2521. It is to be noted that the center of this pulse occurs at the end of the sixteenth of the counted pulses which defines the end of the fifteenth time interval from the beginning of the count. Since the pulses being counted are generated, on the basis of one per cycle, from the frequency $15f$, we have, in effect, timed out exactly one cycle of the base frequency, $f$. Thus, this output pulse, which is designated "look," occurs and is centered accurately upon the end of the integrating interval $\tau$, which is taken as one period of the base frequency $f$. This period embraces an integral number of cycles of each of the signal frequencies, which was stated to be a requirement in connection with Equation 1.

*Multiplying circuit*

As shown in Fig. 1 a signaling conductor 18 extends to each of the multiplying circuits 21 through 25, inclusive. In addition, a second input is provided for each of the multipliers comprising frequencies $12f$ through $16f$. Thus, multiplier 21 multiplies frequency $12f$ with the signaling frequencies derived from conductor 18, multiplier 22 multiplies the signaling frequencies with $13f$, multiplier 23 multiplies the signaling frequencies with $14f$, multiplier 24 multiplies currents of frequency $15f$ with the incoming pulse signaling frequencies from conductor 18, and multiplier 25 likewise multiplies the signaling frequencies with the frequency $16f$. The output of these multipliers extends to a group of summation or integration circuits 31 through 35, inclusive.

A suitable multiplication circuit is shown in greater detail in Fig. 13. Here, the two inputs are represented as A and B. It is assumed for purposes of description that the input A is derived from the output of the band elimination filter 15 and may comprise any two of the signaling frequencies, whereas input B is derived from the local source of frequencies from the frequency converter 17. The A input of all of the multiplying circuits is connected in parallel while the B input is connected to different ones of the locally generated frequencies as described above. Of course, the connections between the A and B inputs may be interchanged and the circuit operates in the same manner as described herein.

Input A is connected to input transformer 1310 which is employed to derive both the voltage substantially in phase with the A input and a voltage substantially 180 degrees out of phase or a −A input. The input transformer 1311 to which the B input is connected is employed to derive both the + and −B voltages in a similar manner. The negative feedback summation amplifier 1312 is provided to sum +A and +B voltages so that the output of this amplifier, derived from transformer 1314 is a voltage which is the sum of the voltages A and B.

The similar summation amplifier 1313 has applied to it a +A voltage and a −B voltage with the result that the output of this amplifier as observed at the secondary of output transformer 1315 has a voltage of $A-B$. The amplifiers 1312 and 1313 invert the phase of the voltages applied to the inputs. The output phases can be maintained or again inverted by means of suitable polarity connections at the output transformers 1314 and 1315. These voltages are applied to square law elements 1316 and 1317, respectively. The square law elements may comprise any non-linear circuit element having a voltage-current characteristic which may be represented by a power series having a square term. An ideal square law element would have a voltage-current characteristic having only a square term. In other words, the coefficients of all the other turns of a power series representing the voltage-current relation of the device would be zero. Such an ideal device, however, is not required. The only requirement is that the voltage-current characteristic of the device have a coefficient for the square term of appreciable magnitude. Various crystal rectifiers, diodes, triode modulators and other types of modulators including solid elements may be employed for the square law element and operated in their normal manner. The output from these devices is again combined by an additional summing amplifier 1318. Thus, an output of $-(A+B)^2$ is obtained from the square law device 1316 while a voltage represented by $+(A-B)^2$ is obtained from the square law device 1317. One-quarter of these voltages is obtained from the voltage dividers and these fractional output voltages are then combined in another summing amplifier 1318. As shown in the drawing the voltage $-\frac{1}{4}(A+B)^2$ obtained from the voltage divider from the square law device 1316 is combined by the voltage $\pm\frac{1}{4}(A-B)^2$ obtained from the voltage divider connected to the square law device 1317. The result of combining these voltages by means of the summing amplifier 1318 is a voltage which is the product of A and B or $A\times B$. The phase of this voltage is also inverted, but this no longer matters.

As pointed out above, the A voltages comprise the signaling voltages which are normally represented by two different currents having different frequencies while the B voltage is due to a current of a single frequency. If now the A and B quantities are replaced by such voltages, the operation of the circuit is represented in one example by the following equations:

$$A=a \sin 12f+b \sin 14f \qquad (2)$$

$$B=c \sin 16f \qquad (3)$$

$$(A+B)^2=a^2 \sin^2 12f+b^2 \sin^2 14f+c^2 \sin^2 16f+2ab \sin 12f \sin 14f+2ac \sin 12f \sin 16f+2bc \sin 14f \sin 16f \qquad (4)$$

$$(A-B)^2=a^2 \sin^2 12f+b^2 \sin^2 14f+c^2 \sin^2 16f+2ab \sin 12f \sin 14f-2ac \sin 12f \sin 16f-2bc \sin 14f \sin 16f \qquad (5)$$

$$-[\tfrac{1}{4}(A-B)^2-\tfrac{1}{4}(A+B)^2]=ac \sin 12f \sin 16f+bc \sin 14f \sin 16f \qquad (6)$$

$$=\tfrac{1}{2}ac \sin 4f+\tfrac{1}{2}ac \sin 28f+\tfrac{1}{2}bc \sin 2f+\tfrac{1}{2}bc \sin 30f \qquad (7)$$

It is thus apparent that where two signaling frequencies are present the output of the multiplying device, that is, the output of the summing amplifier 1318 comprises the product of each of the signaling frequencies with the locally derived frequency. By means of well-recognized mathematical identities each of these products is equivalent to the sum of two new frequencies, one frequency of which is the sum of the product frequencies and the other frequency of which is the difference of the two product frequencies. If one of the two signal frequencies is the same as the local frequency the difference-frequency will be zero, or direct current.

The summing amplifiers 1312, 1313 and 1318 are constructed in the usual manner and operate to sum the input voltages or currents applied to them. The construction and operation of these amplifiers is described in greater detail in United States Patent 2,408,081 granted to C. A. Lovell, D. B. Parkinson, K. D. Swartzel, Jr. and B. T. Weber on September 24, 1946. Such amplifiers are also discussed on page 99 of a book entitled "Vacuum Tube Amplifiers" by the Massachusetts Institute of Technology Radiation Laboratory Series, volume 18, published by McGraw-Hill Book Company in 1948 and edited by Valley and Wallman. A similar arrangement is also described beginning on page 32 of a book entitled "Electronic Instruments" by the Massachusetts Institute of Technology Radiation Laboratory Series, volume 21, published by McGraw-Hill Book Company in 1948 and edited by Greenwood, Holdman and Macrae.

*Summation or integrating devices*

The integrating devices indicated in Fig. 1 by the rectangles 31 through 35, inclusive, are shown in greater detail in Fig. 20. Here, each of the integrating devices comprises a two-section vacuum tube such as tube 2010 in the integrating device 31. The left-hand section of this tube is connected in an integrating circuit having the condenser 2011 connected between its input and output and resistor 2020 connected to its input circuit. It is to be understood, of course, that the left-hand section of this tube merely represents a suitable amplifier which amplifier may comprise more than one stage depending upon the accuracy required for the integration. The integrating amplifiers of the type represented by tube 2010 are described in greater detail beginning on page 78 of a book entitled "Electronic Instruments" of the Massachusetts Institute of Technology Radiation Laboratory Series, published by McGraw-Hill Book Company and edited by L. N. Ridenour. A similar arrangement is also referred to on page 650 of the book entitled "Waveforms" of the Massachusetts Institute of Technology Radiation Laboratory Series, published by McGraw-Hill Book Company, and edited by L. N. Ridenour.

The output of this amplifier tube is also connected to the input of the right-hand section of tube 2010 which operates as a cathode follower and thus permits an output voltage or current to be derived from the integration circuit without materially interfering with the operation of the integrating amplifier and circuit.

The right-hand terminal of condenser 2011 in addition to being coupled to the grid or control element of the left-hand section of tube 2010 also extends to one corner of a bridge arrangement of four diodes 2012, 2013, 2014 and 2015. A source of regulated voltage having a magnitude of about 200 volts in the exemplary embodiment set forth herein, is also connected to the opposite corner of the diode bridge. Leads 2016 and 2017 from the control circuits shown in Fig. 23 and described herein also connected, via resistors 2018 and 2019 to the diode arrangement. Normally, lead 2016 is held at a potential of about 100 volts while lead 2017 is held at a potential of about 300 volts by the circuit of Fig. 23. These voltages cause currents to flow through the resistors 2018 and 2019 and through the diodes 2014 and 2015. Current flows from lead 2017 through resistor 2019 and diode 2015 to the +200-volt regulated voltage supply while at the same time current flows from this supply via diode 2014 and resistor 2018 to lead 2016. These currents bias diodes 2014 and 2015 in their forward, or conducting, direction under which condition they exhibit very low impedance and have negligible voltage drop across them. Thus, the voltages applied to the right-hand terminals of the diodes 2012 and 2013, as shown in Fig. 20, are maintained at substantially 200 volts. Under these conditions the diodes 2012 and 2013 prevent the voltage of the right-hand terminal of condenser 2011 and the voltage of the anode of the left-hand section of tube 2010 from changing appreciably from 200 volts regardless of input through resistor 2020, or previous condition of charge of condenser 2011. If the voltage at this point tends to become more positive than 200 volts, then diode 2012 becomes conducting and prevents an appreciable rise in this voltage. If, on the other hand, a voltage of the anode of the left-hand section of tube 2010 tends to fall, then diode 2013 becomes conducting and tends to maintain the voltage at this point at substantially 200 volts. Thus, normally, the integrating circuit is blocked or prevented from operating in its usual manner.

When it is desired to actuate the integrating circuit the voltages on leads 2016 and 2017 are changed as described hereinbefore. As shown in the drawing and described with reference to Fig. 23 when it is desired to start integration, the voltage on conductor 2016 changes from +100 volts to approximately +300 volts so that the diode 2014 is carried into its back-resistance region and becomes essentially non-conducting with the result that the right-hand terminal of diode 2012 rises to 300 volts. At the same time the voltage applied to conductor 2017 changes from +300 volts to +100 volts. Consequently, the diode 2015 also becomes essentially non-conducting so that the right-hand terminal of diode 2013 falls to a voltage of 100 volts. Consequently, the voltage of the right-hand terminal of condenser 2011 may now vary between +100 volts and +300 volts before either the diode 2012 or 2013 starts conducting. The integrating circuit operates within this range and integrates the applied input voltage over the time interval during which the voltages on the two control leads are maintained at the respective values of about 300 and 100 volts. In order not to impair the accuracy of the integrating process, and to keep it free from the interfering effects of the control pulses, it is desirable that diodes 2012 and 2013 have extremely high back resistance. The back resistance of diodes 2014 and 2015 is much less important in its effect on the integrating action.

The output of the multiplying device, as described above, is connected to the input to the integrator so that only sine waves are applied to the input of the integrator so long as the signaling currents and the currents supplied from the frequency converter 17 do not have the same frequency. If one of the signaling currents and the current from the frequency converter 17 applied to any of the multiplying devices has the same frequency then the difference of these two frequencies, as previously stated, will be zero which is usually described as direct current. The two different conditions are represented by the two curves 2005 and 2006 of Fig. 20. Curve 2005 illustrates the condition where one of the frequencies of the signaling currents is the same as the frequency applied from the frequency converter. There is a direct-current component and a double-frequency component in this case. Curve 2006 represents a typical wave-form of the current applied to the input lead when the two incoming frequencies and the local frequency are all different. The wave-form 2007 of Figs. 20 and 25 represents a typical voltage output from the integrator in response to an input wave-form of the type represented by graph 2005. Likewise, graph 2008 shown in Figs. 20 and 25 represents an output in response to an input voltage represented by the graph 2006. As will be observed at position 2009 of both graphs 2007 and 2008, appreciable output voltage is applied to the output lead when one of the signaling frequencies and the frequency derived from the frequency converter 17 have the same frequency. However, as illustrated in graph 2008 when these frequencies are all different, substantially no output voltage is applied to the output lead at time 2009, although voltages of appreciable magnitude may exist at other times, both before and after this critical time, which represents the expiration of the period $\tau$, the period of the hypothetical base frequency of the signals.

The output leads of the integrators, as shown in Fig. 1, extend to the detector circuits shown as rectangle 27 in Fig. 1 and disclosed in detail in Fig. 14, which detector circuits are activated by means of a gating pulse at a time corresponding to the time represented by 2009 in Figs. 20 and 25.

When the time interval between the beginning of integration and the time of gating the detectors is chosen such that each of these frequencies passes through an integral number of complete cycles during the interval, although the number will be different for the different frequencies, then currents having frequencies which are the sum and the difference of these various frequencies will also pass through an integral number of whole cycles within this time interval. Since the time integral of a sine function for a whole number of cycles is zero the output of each integrator which is supplied from the multiplier which in turn is supplied by currents having all different frequencies should be zero.

In other words, when an integrator such as 31 has supplied to its input products of currents having different frequencies, the voltage or potential across the condenser 2011 should return to its initial condition at times represented by an integral number of cycles of both of the frequencies of the supplied currents. Thus, this condenser should return to its initial condition at the end of each interval $\tau$ so that the voltage or potential of the right-hand terminal of this condenser should also be returned to its initial voltage of approximately 200 volts at the end of the integrating time interval $\tau$.

The right-hand terminal of condenser 2011 is connected through a voltage dividing resistance network comprising resistors 2021 and 2022 so that, in the exemplary embodiment set forth herein, the output lead 2023 of the integrating circuit has approximately zero output with respect to ground when a voltage of the right-hand terminal of condenser 2011 is at about 200 volts. In other words, the right-hand section of tube 2010 is connected as a cathode follower stage and has its grid connected to the junction between resistors 2021 and 2022. Thus, the output of the cathode of this section of tube 2010 will be at zero level which may be substantially ground potential when the voltage of the right-hand terminal of condenser 2011 is 200 volts in the exemplary embodiment described herein. Consequently, since the voltage of the right-hand terminal of condenser 2011 returns to 200 volts at the end of the time interval $\tau$ the output of the integrating circuit will be substantially zero at this time when the frequencies of the input currents to the respective multipliers are different. Such an output curve is illustrated by the graph 2008 in Figs. 20 and 25 and as shown in these figures return substantially to zero at the end of the integration time interval represented by time 2009.

When the multiplier circuits are supplied by two currents having the same frequencies then the difference of these frequencies will be zero cycles per second or direct current with the result that the time integral of this quantity increases with time. As a result, at the end of the time interval $\tau$ the voltage of the right-hand terminal of condenser 2011 has a large deviation from the 200 volts to which it was originally set. As a result, this voltage deviation is repeated through the right-hand section of tube 2010 and causes a large voltage output from the output conductor 2023. A typical wave-form under these conditions is represented by curves 2007 in Figs. 20 and 25 and as illustrated at the end of the interval $\tau$, represented by time 2009, a large output voltage exists on lead 2023.

At a later instant of time the voltages on leads 2016 and 2017 are returned to their original voltages of 100 and 300 volts with the result that the diodes 2014 and 2015 start to conduct and return the right-hand terminals of diodes 2012 and 2013 to 200 volts as described above in the exemplary embodiment of this invention described in detail herein. Consequently, the voltage of the right-hand terminal of condenser 2011 is restored to 200 volts and condenser 2011 readjust its charge, via resistor 2020 and the driving circuit connected thereto, namely the output of the multiplying circuit. The circuit is then in condition to perform another integration for a succeeding time interval $\tau$ under control of the control pulses.

In the above description, both of the multiplying circuits shown in Figs. 1 and 13 and the integrating circuit shown in Figs. 1 and 20, it has been assumed that the signaling frequencies and the locally generated frequencies are approximately in phase. In other words, it has been assumed that the phase difference between the frequency $12f$ supplied to the multiplying device 21 from the frequency converter 17 and the signaling frequency $12f$ supplied to the multiplying device 21 over conductor 18 from the subscriber's station 11 is substantially zero. It is essential that this phase difference does not approach 90 or 270 degrees because under these circumstances the output of the corresponding integrating device would approach zero. If the locally generated currents and the corresponding signaling currents received from a short subscriber's line do not have substantially zero phase difference, then phase shifting networks will be included in either the frequency converting equipment 17 or in the band-pass filters 15 or 16 or in amplifiers 13 or 14 or in any number or all of these circuits. Likewise, the relative phase shift of the signaling frequencies over the various subscribers' lines must not vary by any phase angle approaching 90 degrees. As pointed out hereinbefore, the differences between the phase delays over any of the subscribers' lines should not exceed about 60 degrees for successful operation of the signaling system thus far described.

*Detector circuit*

The output from the integrating circuits is connected to detector circuits represented in rectangle 27 in Fig. 1 and shown in greater detail in Fig. 14. As shown in Fig. 14 each detector circuit comprises multielement hot cathode gas discharge tubes in the exemplary embodiment of the invention described herein. One of the control elements or grids of each of the tubes is connected together and connected to the gating or "look" pulse circuit. This circuit is shown in Fig. 22 and as indicated there the lead extending to the detector circuit is normally maintained at −50 volts. With this control element in all tubes maintained at −50 volts, discharges cannot be initiated through any of the tubes by any voltage normally available to the control element or control grids of these tubes by the output of the respective integration circuits. The output of the integration circuits is connected to a control element or grid of each of these tubes through a voltage divider connected to an adjustable source of bias to permit initial adjustment of sensitivity. When the output voltage from two of the integrating circuits rises to an appreciable value as illustrated at time 2009 on curve 2007 and a "look" or output pulse is obtained from Fig. 22, raising the voltage of the other control element of all of the tubes to a value somewhat positive with respect to ground, a discharge will be initiated in the two corresponding detector tubes. The remaining three tubes will not be ionized because the initial bias on their control grids has not been overcome by the large integrator output voltages. The action of the condenser in the plate circuit together with the voltage divider resistors cause the tube to go out or the discharge through it to be interrupted a short predetermined interval of time after a discharge has been initiated. During the time the discharge is flowing through a tube an output voltage is developed on the output lead connected across the cathode resistor of the ionized tube.

*Steering circuit*

As shown in Fig. 1 a steering circuit 36 is required to steer or properly direct the various signals to the proper register circuits or groups of register tubes. A suitable steering circuit is shown in greater detail in Fig. 15 and comprises a series of multielement hot cathode gas filled tubes, in the exemplary embodiment of this invention described herein. The steering circuit shown in Fig. 15 receives pulses from two different sources. One pulse is obtained from the circuit 46 for each group of frequencies received and the other is obtained from the start circuit 20 as a result of the blank interval in transmission which indicates the beginning of a complete number to be transmitted immediately. This latter function is sometimes referred to as "number start." The pulse from the start circuit 20 of Fig. 1 which is shown in greater detail in Fig. 11 is a positive-going voltage and is applied, via a condenser and buffer resistance, to one of the grids of tube 1510. This grid is also supplied with an appropriate negative direct-current bias. Inasmuch as the other grid is maintained substantially at cathode potential when the tube is not ionized, the control pulse applied from the start circuit will always initiate a discharge through tube 1510 if it is not already ionized. The "look" pulse from the circuit 46 of Fig. 1 which is shown in greater detail in Fig. 22 is applied to a control member or grid of each of the succeeding tubes 1511, 1512, 1513 and 1514 through a coupling condenser. These grids are also supplied with an appropriate negative direct-current bias. When a discharge is initiated through tube 1510 in response to the operation of the start circuit, current flows through the common anode resistor 1515, through tube 1510 and then through the cathode resistor to ground. The voltage drop across the cathode resistor 1516 is summed with a negative bias by means of a resistance network 1517 and 1519 and applied via a smoothing network comprising resistor 1518 and condenser 1520 to one of the control grids of tube 1511. This results in "priming" tube 1511, that is reducing the negative bias on one of its grids to a value such that similar reduction on its other grid will allow it to fire. Thus the next "look" pulse when received from circuit 46 as described herein will cause a discharge to be initiated through tube 1511. In other words, the first look pulse after the start of a complete subscriber's designation initiates a discharge through tube 1511, the discharge current of which flows through resistor 1515. As a result upon the initiation of a discharge through tube 1511, additional current flows through resistor 1515 causing the voltage applied to the anodes of all the tubes 1510 through 1514 to be sharply reduced. The condenser connected around the cathode resistor of tube 1510, however, maintains the cathode of this tube at the relatively high positive voltage established by the tube current which has been flowing through the cathode resistor so that the initiation of a discharge through tube 1511 results in the reduction of the anode potential of all of the tubes to an instantaneous voltage below the voltage of the cathode of tube 1510. Consequently, the discharge previously flowing through tube 1510 is interrupted. Thereafter, current continuously flows through tube 1511 until discharge is initiated through tube 1512 in a manner similar to that described above with reference to tube 1511. The initiation of a discharge through tube 1512 in turn causes the discharge previously flowing through tube 1511 to be interrupted. The other tubes are rendered conducting in succession and each tube having the flow of discharge current initiated through it conditions the next succeeding tube to respond to the next "look" or gating pulse and the initiation of a discharge current through any tube causes the interruption of the discharge current flowing through the previous tube. In this manner, the steering circuit is advanced from tube to tube upon the application of each of the look pulses to the system. Connections extend from the cathode of each of the steering circuit tubes to enabling leads in the register circuit. As a result, when a positive voltage is applied to the enabling leads by discharge current flowing through the corresponding steering circuit tubes, the various groups of tubes in the register are conditioned to respond to the succeeding signals conveyed to them from the detector circuits.

Five tubes are shown in Fig. 15. The first of these, 1510, serves as a "pre-steering" tube which "primes" or renders capable of operation the second tube 1511. This second tube, 1511, when ionized, performs the external function of conditioning the register circuit, hereinafter described, to receive and register the signals constituting the first digit or symbol of the transmitted called-subscriber's number or station designation, in addition to the internal functions, hereinbefore described, of extinguishing ionization in the first tube, 1510, and priming the next tube, 1512, so that it may be ionized by the next "look" pulse. Tubes 1512 and 1513 perform the external function of successively conditioning the second and third digit-positions in the register circuit. Tubes 1511, 1512 and 1513 may be called "digit tubes" because of their external function.

It is to be understood that any number of tubes such as 1511, 1512 and 1513 may be added to the circuit of Fig. 15, following tube 1513, to provide for as many stages in the steering circuit as may be desired or required. As will be made plain hereinafter, one such steering tube is required for each digit to be registered in a register circuit. A full complement of tubes to control a register for the registration of the eight-digit number assumed in the illustrative embodiment of this invention would therefore comprise five more tubes following tube 1513, and not counting tube 1514, which serves a special purpose hereinafter described.

However, as pointed out hereinbefore, it may be desired to register some number of digits other than the full complement, for example, the first three digits comprising the "office designation," at an intermediate switching point. This is the embodiment illustrated here.

At some switching centers it may be desirable to employ an intermediate or final group of the digits of a subscriber's designation and to provide registers for only those digits actually employed at the switching center. Under these circumstances, it will be necessary to provide a steering circuit tube for each digit to be registered and employed at the switching center and in addition an additional switching circuit tube must be employed for each digit of the subscriber's designation prior to the digits which it is desired to employ at the switching center. These prior tubes serve only to condition a succeeding tube and thus count the prior digits. When desired these "prior" tubes of the steering circuit may be replaced by any suitable counting circuit or apparatus.

The special purpose served by tube 1514 is the extinction of discharge in the last of the tubes whose cathode carries a connection to the register circuit. Upon receipt by the steering circuit of the next "look" pulse following the one which initiated discharge in the last of the "digit" tubes, the final tube in the sequence, 1514, which had been primed by the ionization of the last "digit" tube, will itself be ionized and will extinguish the said last "digit" tube. The extinction of the last "digit" tube removed the "enablement" or "conditioning" of the last group of tubes in the register, which now presumably contains an indication of the last of the transmitted sequence of digits. By removing the enablement from the last register group it is insured that any further reception of noise or spurious signals, arriving after completion of the transmission of the desired signals, cannot change, impair or mutilate the indications in the register.

A discharge through this special purpose tube causes the voltage of its cathode to rise to a relatively high positive voltage which voltage may be employed to control other circuits as described herein.

Tube 1514 remains ionized until the next input pulse from the start circuit, Fig. 11, is applied to the control element or grid of tube 1510. Arrival of this pulse will cause ionization of tube 1510, as hereinbefore described, and this action will extinguish tube 1514 in the manner previously explained.

*The register circuit*

The register circuit is indicated in Fig. 1 as 29 and Fig. 16 shows the register circuit in detail, which includes an array of gas filled multielement hot cathode discharge tubes in which five tubes, corresponding to the five signaling frequencies, are provided for each of the symbols or numerals of a called subscriber's designation. The five tubes in each of the horizontal rows are employed to register the identity of one of the numerals or symbols of a called subscriber's station number or other identification. One of the control elements or grids of each of the tubes of each row is connected, through individual input-summing resistors, to one of the enabling conductors such as 1601, driven from the steering circuit via a condenser and supplied with appropriate negative bias. The multielement gas tubes are similar to those described with reference to the detector circuits shown in Fig. 14. Their other control elements or grids in this case, however, are connected to ground. Consequently, when it is desired to store indications representing a numeral in the register circuit the steering circuit applies a positive pulse to the enabling lead of the register group or row of tubes and at the same time the output from the corresponding detector circuits is applied to other enabling leads such as 1680, which run vertically on the drawing and affect all register tubes in one column, that is to say, all tubes corresponding to that frequency in each digit place. Summing resistors are connected between this lead and the individual control elements of each tube in the column. The lead is supplied with appropriate negative bias and the output of the detector is coupled to it via a condenser. When pulses from both the steering circuit and a detector circuit sum together on the control elements of a given tube a discharge will be initiated through that tube. As pointed out above, since each symbol or numeral is represented by two different currents having different frequencies, discharges are initiated in two tubes of each row of the register as shown in Fig. 16 in response to the signals representing the respective symbols or numerals of the called station.

When a discharge is initiated through the respective register tubes the discharge current flows through the current limiting resistors such as 1640, 1641 and 1647, respectively, for the register tubes 1610, 1611 and 1617. In addition, the discharge current flows through the windings of respective relays 1650, 1651 and 1657 causing these relays to operate when a discharge current flows through the corresponding register tube. The contacts of these relays are shown on other figures such as Fig. 19. While only the windings are shown in Fig. 16, it is to be understood that a sufficient number of contacts for each of the relays is provided. A diode or crystal rectifier such as 1660, 1661 and 1667 is connected in parallel with the windings of the respective register relays 1650, 1651 and 1657. These diodes are provided and connected in a direction so that they do not interfere appreciably with the flow of the discharge current from the respective tubes through the windings of the respective relays. These rectifiers do, however, prevent a high voltage from being developed across the windings of these relays when a discharge through the corresponding tubes is interrupted.

In order to interrupt a discharge through the relays the high voltage anode battery supply 1605 is interrupted in a suitable manner such as under control of recycle relay 1851, a number completed relay 1850 or in any other suitable manner. When these relays have released and restored the high voltage battery supply, then the register circuit will again be in condition to respond to succeeding signals to be registered therein.

Only three rows of five tubes each are shown in Fig. 16. This layout is capable of registering only three digits or symbols of the called subscriber's number. It is to be understood that as many more rows as desired may be added, each row capable of registering an additional serial digit. The full complement required to register an eight-digit number would be eight groups of five tubes each. The registration of the first three digits only, however, is in accord with the illustrative embodiment hereinbefore explained.

*Checking circuits*

Three different types of checking circuits are provided to insure proper operation of the receiving equipment. First, a complete embodiment of the checking circuit shown in Fig. 17, is provided for each of the symbols or digits or denominational orders of the subscriber's number or designation. The output of each of these circuits in accordance with Fig. 17 extends to a circuit in accordance with Fig. 18 which is employed to check the complete registration of a subscriber's station identification and to control the subsequent response of the receiving system.

An additional comparing circuit shown in Fig. 19 is provided which may be employed in combination with test signals transmitted over the subscriber's line or from a suitable test position located within the telephone office and connected to the signal receiving equipment by suitable switching equipment. The circuit shown in Fig. 19 is arranged to indicate the proper or improper response of the receiving equipment to test signals transmitted over the system for testing purposes.

The circuit shown in Fig. 17 is arranged to differentiate or make a distinction betwen an indication of two received frequencies for each numeral or symbol and an indication of any other number of frequencies simultaneously received to designate a numeral or symbol of a subscriber's designation. In other words, this circuit is designed to exploit the so-called "checkable" feature of the two-out-of-five code employed herein for signaling. The cathodes of each of the register tubes for the first digit such as the cathodes 1610, 1611, 1612, 1614, 1617 are connected through a set of resistance networks to the control element of tubes 1742 and 1743. When a discharge flows through any of the register tubes its cathode is raised to a relatively high positive voltage. The cathode of the tube 1742 which is connected as a cathode follower, is connected to one of the elements of the control gap of tube 1744 via two resistors in series, 1760 and 1761. Tube 1744 is a cold cathode gas discharge tube in which a discharge is initiated within the tube when the voltage drop between control elements 1710 and 1711 exceeds a predetermined value. Thereafter, the discharge transfers to the main path through the tube between elements 1710 and 1712 and produces a voltage across the output resistor 1710.

Due to the summing action of the resistor group 1740 and resistor 1750 the voltage at the grid of tube 1742 is a function of the fixed bias battery potential 1711 together with the voltage applied from the cathodes of the five register tubes. The voltage from the register tubes, however, has one or the other of two quite uniform values. It is substantially zero if the tube is not ionized or has a value of the order of 100 volts positive, in this embodiment, if the tube is ionized. Thus it will be seen that the voltage at the grid of tube 1742 will be proportional to the number of register tubes in the connected group which are ionized. When none are ionized, it is a low positive voltage and when all are ionized it is a high positive value. Ionization of an intermediate number, such as two, will produce an intermediate value of positive voltage. When two or more of the register tubes have a discharge initiated through them, a sufficiently high voltage is applied to control element of tube 1742 so that its cathode will apply through resistors 1760 and 1761 a discharge initiating voltage to the right-hand starter electrode 1711 of tube 1744. If a discharge is initiated through only one or more of the register tubes, the voltage applied to this electrode is not sufficiently high to initiate a discharge through the tube 1744.

A shunting tube 1743 is provided with its anode connected to the junction of resistors 1760 and 1761, and arranged with its control element connected to resistor networks comprising resistor group 1741 and resistor 1751. This resistor network is arranged so that tube 1743 is non-conducting when two or less than two of the cathodes of the register tubes are raised to their characteristic positive voltage. If, however, three of these tubes are ionized and supply their positive voltage then tube 1743 becomes conducting and shunts the output of tube 1742 thus preventing a sufficiently high voltage from being applied to the right-hand starter electrode of tube 1744 to start a discharge through this tube.

Thus, a discharge is initiated through tube 1744 of the digit checking circuit shown in Fig. 17 when two and only two out of five tubes of the register circuit employed to store or register a digit or symbol have discharges initiated through them. By providing a Figure 17 circuit for each of the register tube groups employed to register the symbols or digits of the subscriber's number the representation of each of these symbols or digits by a two-out-of-five selection of the frequencies is readily checked.

The discharges through tube 1744 are interrupted by removing the high voltage battery supply 1705 by operation of a recycle or number completed relay or in any other suitable manner. Upon reclosure of this energy supply the circuit again becomes ready to check the number of frequencies representing each digit.

A circuit in accordance with Fig. 18 is provided to check that all of the digits making up the representation of the subscriber's designation have satisfied their individual digit. The output of each of the circuits of Figure 17 employed is connected to one of the input terminals 1819 of Fig. 18, the number checking circuit.

The resistance network comprising resistor 1820 and resistor group 1821 is so arranged that insufficient voltage is applied across the starter gap electrodes 1810 and 1811 of the cold cathode gas discharge tube 1845 unless a positive voltage is received on each of the input terminals from the corresponding tube 1744 of the corresponding digit checking circuit in accordance with Fig. 17 for which the resistance network is designed. As shown in this embodiment it is designed for three inputs. When a discharge is initiated through all of these digit checking circuit tubes corresponding to tube 1744, a discharge will also be initiated through tube 1845 which discharge applies a positive voltage pulse to the left-hand grid of tube 1846 via the differentiating condenser 1822.

Tube 1846 has both of its sections arranged in a single cycle multivibrator circuit such that the right-hand section is normally conducting current and the left-hand section is cut off. Thus, when a positive voltage is applied to the grid of the left-hand section, current starts to flow through this section and cuts off the flow of current through the right-hand section. The time constants of the resistors and condensers of this single cycle multivibrator circuit are such that it will remain with the left-hand section conducting, once conduction is started, for the order of 10 to 12 milliseconds. In other words, of the order of one digit interval.

The anode of the right-hand section of tube 1846 is direct coupled to one of the control elements or grids of tube 1847 while the anode of the left-hand section is direct coupled to a corresponding control element of tube 1848. Tubes 1847 and 1848 are hot cathode gas discharge tubes in which the control elements control the initiation of a discharge through the tubes and thereafter lose control of the discharge flowing through the tubes, Normally, with the right-hand section of tube 1846 conducting and the left-hand section non-conducting the control element of tube 1848 is at substantially ground potential whereas the control element of tube 1847 is at a much more negative voltage such as negative 50 volts, for example. When tube 1846 is actuated so the left-hand section is conducting and the right-hand section is cut off, then the voltage applied to the control elements of tubes 1847 and 1848 is interchanged, that is, the voltage applied to the control element of tube 1847 rises to substantially ground potential whereas the voltage applied to the corresponding control element of tube 1848 falls to a low value such as —50 volts.

The other control element of each of these two tubes is supplied with a fixed negative bias and is also supplied, via coupling condensers, with positive pulses from switch 1830. With switch 1830 set as shown in the drawing the positive pulse is obtained from the steering circuit. When the steering circuit comes to the end of its chain, a discharge is initiated through the final tube 1514, as previously explained, which causes its cathode to be raised to a high positive voltage. If switch 1830 is moved to the opposite position to that shown in the drawing then the positive pulse is obtained from the start circuit. When it is desired to employ the digits as soon as they are received switch 1830 will be set as shown in the drawing. When different numbers of digits may be employed on different calls it may be desirable to move switch 1830 to the opposite position.

This positive pulse through switch 1830 will initiate a discharge through one or the other of the tubes 1847 or 1848. If tube 1846 is in its normal condition with the right-hand section conducting when a discharge is initiated through the final tube 1514 of the steering circuit, then the discharge will be initiated through the recycle tube 1848 and in turn cause a relay 1851 in its cathode circuit to operate and remove the high voltage supplied to the gas tubes of Figs. 18, 17 and 16 as described above.

If, on the other hand, the conduction within tube 1846 is shifted when the positive voltage from the start or steering circuit is applied to the control elements of tubes 1847 and 1848 then the discharge will be initiated through tube 1847 and cause the operation of the corresponding relay 1850 indicating the reception of the expected number of checked digits; that is to say the number of digits for which the steering circuit, register circuit and number checking circuits were designed. In the illustrated embodiment, this is the first three out of eight transmitted digits. It is to be understood that with different arrangements of an obvious nature a partial registration comprising any desired subgroup of digits, or a complete registration of the full number could be obtained. The operation of relay 1850 may be then employed to actuate other circuits to utilize the received signal information.

The operation of relay 1851, as described above, is employed to initiate "recycling" of the equipment so that information received and stored but which fails to check properly may be discarded. After such discarding or recycling process, the equipment will respond to a succeeding series of pulses in the repetitively transmitted sequences representing the called subscriber's station designation. Here again, diodes are connected in parallel with the windings of relays 1850 and 1851 in such a direction that they do not materially interfere with the flow of current through these relays but prevent high voltage surges from appearing across the windings of these relays when the current is interrupted through them by the interruption of the discharge through corresponding tubes 1847 and 1848. These relays have a multiplicity of contacts, not shown in Fig. 18.

Fig. 19 shows a comparator circuit for test purposes. In this circuit the windings of the relays connected in the cathode circuits of the register tubes of Fig. 16 are again shown, together with certain of the contacts of these relays. In addition, a key is provided individual to each of these relays. The keys are preset to an indication of the test number to be checked and this number is also set up on the number selector dials of a test signal transmitter such as that hereinbefore described. Said signal transmitter is then connected, by switching means, to the signal receiver being tested. Each of the comparator keys when operated causes a corresponding lamp such as lamp 1957 to be lighted to indicate the number set up on the keys. Then upon the operation of the corresponding relays in response to the received number sent from the test signal transmitter a second lamp such as 1958 is likewise lighted affording a visual check between the transmitted and received numbers. In addition, the relay and key contacts are interconnected to give a path from battery 1910 through contacts on a number completed relay such as relay 1850 or a relay controlled thereby to an "OK" message register relay or to an "error" message register relay depending upon whether or not the same number is received as is set up on the corresponding keys. In this manner, test signals may be transmitted from the subscriber's station or from a test location and the accuracy of the operation of the equipment determined and registered for many successive transmissions of the test number, thus affording a statistically significant test and check procedure.

*Alternative embodiment*

Figure 1A:
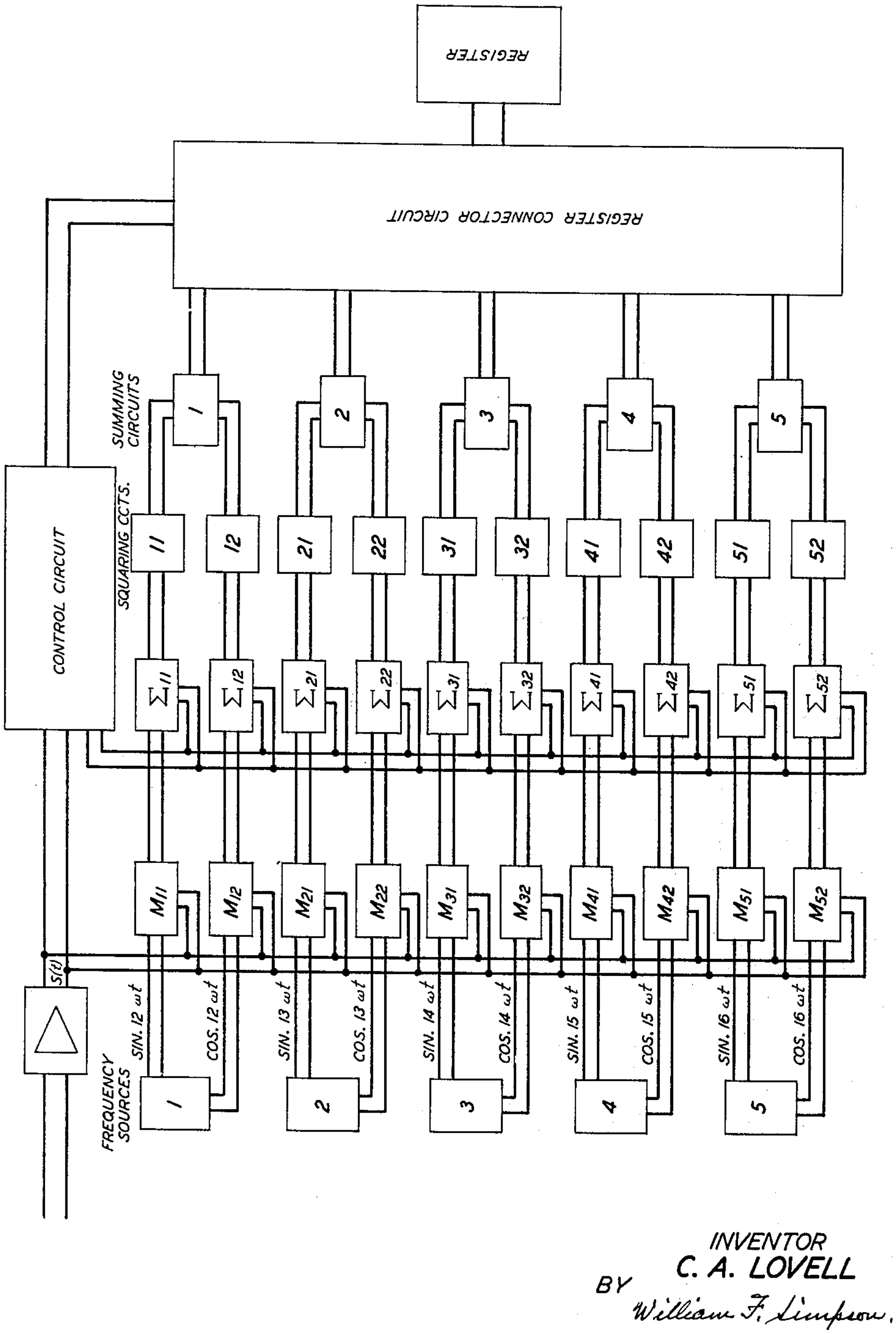
Fig. 1A shows an alternative arrangement suitable for use on calling lines having large differences in phase or transmission delays.

As pointed out in the exemplary system described above, the various subscribers' lines must not have an excess amount of phase delay between the various frequencies transmitted over them if the equipment is to function successfully. If the difference in phase delay approaches 90 degrees between the different frequencies, then the output of the multiplying and integrating circuits, which attempt to recognize the presence of a signal frequency by "beating" it with the same frequency, approaches zero even when the frequencies are the same so that it becomes impossible to recognize the presence of the corresponding frequencies. However if, under these circumstances, the local source of frequencies, or the frequency converter represented by rectangle 17 and shown in Fig. 12, is arranged to generate currents represented by cosine functions instead of sine functions, then for phase shifts of 90 degrees the output will be maximum for the desired frequencies instead of minimum and the minimum will occur in the presence of zero phase shift. If currents having both sine and cosine functions are generated and the multiplying and integrating circuits duplicated and the outputs combined in any suitable manner, then the combined output is relatively unaffected by the different phase displacements between the received currents. Such an arrangement is shown in Fig. 1A. Here, a plurality of sources 1 through 5 are shown for generating both sine and cosine functions of the signaling frequencies $12f$ through $16f$. As shown in Fig. 1A these sources are represented as separate oscillators but may also be outputs from the frequency converter such as shown in Fig. 17 wherein phase shifters are employed to derive the cosine functions by delaying or advancing the sine outputs by 90 degrees and then supplying these currents to additional multiplying circuits and integrating circuits. The output of the integrating circuits is then squared, i. e., multiplied by itself, by use of the multiplying techniques already explained and applied to summing circuits which combine the squares of the outputs. The outputs from the summing circuits are then employed to control the register circuits as described herein. The squaring circuits described herein may be in accordance with the disclosure of Patent 2,401,779, granted to K. D. Swartzel, June 11, 1946.

It is to be understood that the above-described arrangements are illustrative of the application of the principles of the invention. Numerous other arrangements may be devised by those skilled in the art without departing from the spirit and scope of the invention.

What is claimed is:

1. A call signaling arrangement comprising in combination a calling station, a receiving station, a line interconnecting said stations, a plurality of motor-driven alternating-current generators at said calling station for generating alternating currents having different frequencies, apparatus for continuously supplying one of said alternating currents to said line, manually selecting means for selecting successive ones of said frequencies in accordance with signals to be transmitted, a motor-driven distributor for selectively applying said selected frequencies to said line, means for deriving a plurality of reference alternating currents at said receiving station, apparatus at said receiving station responsive to said continuously transmitted frequency for controlling the frequency and phase of each of said reference alternating currents to substantially the same phase of frequency as said currents generated at said calling station, apparatus for multiplying each of said reference frequencies at said receiving station with a plurality of said received frequencies, integration apparatus for integrating the product of said frequencies for a predetermined interval of time, and means responsive to said integration apparatus for recording signals transmitted from said calling station.

2. In combination, a calling arrangement comprising a plurality of sources of alternating currents having different frequencies, manual means for selecting predetermined ones of said frequencies for transmission, a sequence device for successively transmitting said selected frequencies, apparatus for continuously deriving reference alternating currents having substantially the same phase and frequency as said alternating currents, a multiplying apparatus for individually multiplying each of said reference alternating currents with all of the transmitting currents, integrating means for integrating the output of said multiplying devices, timing means for determining a time interval equal to an integral number of cycles of all of said alternating currents, connections from said timing means to said integrating means for rendering said integrating means operative during said time interval.

3. In a signal calling arrangement, detecting means for individually detecting alternating currents having different frequencies comprising a multiplying device for each current to be detected, means for continuously applying an alternating current to said multiplying device having substantially the same phase and frequencies as the current to be detected by said current, other apparatus for applying all of the alternating currents to be detected to said device, integrating means connected to the output of said multiplying device, and apparatus for rendering said integrating means operative during a predetermined interval of time during the application of said alternating currents to said multiplying device.

4. In a signal calling arrangement, detecting means for individually detecting alternating currents having different frequencies comprising a multiplying device for each current to be detected, means for continuously applying an alternating current to said multiplying device having substantially the same phase and frequencies as the current to be detected by said current, other apparatus for applying all of the alternating currents to be detected to said device, integrating means connected to the output of said multiplying device, apparatus for rendering said integrating means operative during a predetermined interval of time during the application of said alternating currents to said multiplying device, and apparatus for counting a predetermined number of cycles of one of said alternating currents for determining the length of said integrating interval of time.

5. In a calling arrangement in combination, a calling line, apparatus responsive to alternating currents having a plurality of different frequencies received over said line including means responsive to a predetermined one of said frequencies comprising in combination an independent source of alternating current having substantially the same frequency as said received alternating current, apparatus for multiplying together said current derived from said independent source and all of the received alternating currents, an integrating device connected to said multiplying means and apparatus for energizing said integrating device for a predetermined interval of time, means responsive to the output of said integrating device to indicate the presence of an alternating current of said predetermined frequency in said received currents.

6. In a signaling arrangement in combination, a receiving apparatus responsive to successive code groups of signals, each code group of which comprises two-out-of-five alternating currents of different frequencies comprising in combination a source of reference alternating currents having substantially the same frequency as said received alternating currents, a multiplying apparatus for multiplying each of said reference sources with all of said received currents, integrating means interconnected with said multiplying devices, apparatus connected to said integrating means responsive to and only responsive to two out of five of said different frequencies simultaneously received at predetermined instants of time.

References Cited in the file of this patent

UNITED STATES PATENTS

| | | |
|---|---|---|
| 1,972,289 | Chauveau | Sept. 4, 1934 |
| 2,325,829 | Boswau | Aug. 3, 1943 |
| 2,400,260 | Miller | May 14, 1946 |
| 2,470,145 | Clos | May 17, 1949 |
| 2,540,156 | Wright | Feb. 6, 1951 |